(12) United States Patent
Scarth

(10) Patent No.: US 11,655,100 B2
(45) Date of Patent: May 23, 2023

(54) CART LOADER/UNLOADER AND A SWITCHER SYSTEM

(71) Applicant: SailRail Automated Systems, Inc., Markham (CA)

(72) Inventor: Ian Scarth, King City (CA)

(73) Assignee: SAILRAIL AUTOMATED SYSTEMS, INC., Markham (CA)

( * ) Notice: Subject to any disclaimer, the term of this patent is extended or adjusted under 35 U.S.C. 154(b) by 264 days.

(21) Appl. No.: 16/840,870

(22) Filed: Apr. 6, 2020

(65) Prior Publication Data
US 2021/0309500 A1    Oct. 7, 2021

(51) Int. Cl.
*B65G 1/04* (2006.01)
*B66F 7/06* (2006.01)

(52) U.S. Cl.
CPC .............. *B65G 1/0485* (2013.01); *B65G 1/04* (2013.01); *B65G 2201/0267* (2013.01); *B65G 2814/0313* (2013.01); *B66F 7/0658* (2013.01); *B66F 7/0666* (2013.01)

(58) Field of Classification Search
CPC .......... B65G 1/0485; B65G 2201/0267; B65G 2814/0313; B66F 7/0658; B66F 7/0666
USPC .................................. 414/222.07, 286, 609
See application file for complete search history.

(56) References Cited

U.S. PATENT DOCUMENTS

| | | | |
|---|---|---|---|
| 2,903,219 A | 9/1959 | Ingham | |
| 3,361,999 A | 1/1968 | Leinauer et al. | |
| 3,608,920 A | 9/1971 | Rubin | |
| 3,887,207 A | 6/1975 | Gotsch | |
| 4,515,518 A | 5/1985 | Gilbert et al. | |
| 4,568,233 A * | 2/1986 | Baker ................ | B65G 1/0464 414/561 |
| 4,687,215 A | 8/1987 | Brendgord et al. | |
| 4,815,914 A * | 3/1989 | O'Brien ............. | B65G 1/02 414/285 |
| 4,971,506 A * | 11/1990 | Givati ................ | E04H 6/182 414/256 |
| 5,020,382 A * | 6/1991 | Lutz ................... | B66F 9/04 414/609 |

(Continued)

FOREIGN PATENT DOCUMENTS

| | | | | |
|---|---|---|---|---|
| CA | 3001808 A1 * | 10/2018 | .......... | B65G 1/0407 |
| CA | 3001808 A1 | 10/2018 | | |

(Continued)

*Primary Examiner* — James Keenan
(74) *Attorney, Agent, or Firm* — Workman Nydegger

(57) ABSTRACT

An industrial materials handling system including a base member having a loading end with a first senor that detects when a first carriage or second carriage is positioned in a loading/unloading position at the loading end, and an operator end with a second sensor that detects when the first or second carriage is positioned in the loading/unloading position, a controller coupled to the first sensor and second sensor, the first carriage coupled to the base member and a first drive mechanism controlled by the controller to move the first carriage, the loading end, and the operator end, the second carriage coupled to the base member and to a second drive mechanism configured to move the second carriage between the loading end and the operator end under the control of the controller, and a bypass mechanism to move the second carriage between the loading end and the operator end.

8 Claims, 18 Drawing Sheets

Loading Full Rack Into Position 1 - Empty Machine

(56) References Cited

U.S. PATENT DOCUMENTS

| | | | |
|---|---|---|---|
| 5,129,776 A * | 7/1992 | Peng | B66F 7/0658 |
| | | | 414/228 |
| 5,310,305 A * | 5/1994 | Lutz | B65G 1/127 |
| | | | 414/609 |
| D448,135 S | 9/2001 | Petro | |
| 6,286,654 B1 * | 9/2001 | Gorniak | B65G 1/0414 |
| | | | 198/347.4 |
| 6,676,233 B1 * | 1/2004 | Evans | B66B 9/02 |
| | | | 187/401 |
| 6,866,463 B2 | 3/2005 | Riordan et al. | |
| 7,559,736 B1 | 7/2009 | Mohan | |
| 7,806,646 B2 | 10/2010 | Riordan et al. | |
| 8,109,526 B2 | 2/2012 | Mason et al. | |
| 8,302,975 B2 | 11/2012 | Hergeth | |
| 8,360,459 B2 | 1/2013 | Holtan et al. | |
| 8,505,933 B2 | 8/2013 | Bernard et al. | |
| 8,540,255 B2 | 9/2013 | Young | |
| 8,590,921 B2 | 11/2013 | Benson et al. | |
| 9,078,967 B2 | 7/2015 | Oerter et al. | |
| 9,211,900 B2 | 12/2015 | Knepp | |
| 9,227,645 B2 | 1/2016 | Franco | |
| 9,290,214 B2 | 3/2016 | Badura et al. | |
| 9,561,910 B1 * | 2/2017 | Orsini | B65G 19/02 |
| 9,676,314 B2 | 6/2017 | Neubauer | |
| 9,738,299 B2 | 8/2017 | Ard et al. | |
| 9,738,465 B2 | 8/2017 | Berghammer | |
| 9,862,435 B2 | 1/2018 | Scarth et al. | |
| 10,093,334 B1 | 10/2018 | Brown et al. | |
| 10,207,308 B2 * | 2/2019 | Kowal | B21D 28/04 |
| 10,377,434 B2 | 8/2019 | Berghammer | |
| 10,391,625 B2 | 8/2019 | Gang et al. | |
| 10,640,297 B2 * | 5/2020 | Kilibarda | B65G 35/06 |
| 11,014,593 B2 | 5/2021 | Knepp et al. | |
| 2010/0066045 A1 | 3/2010 | Presnell et al. | |
| 2019/0225285 A1 | 7/2019 | Packeiser et al. | |

FOREIGN PATENT DOCUMENTS

| | | | |
|---|---|---|---|
| DE | 102010043207 A1 | 3/2012 | |
| WO | 2015071268 A1 | 5/2015 | |
| WO | WO-2015071268 A1 * | 5/2015 | B65G 47/082 |

* cited by examiner

Second Full Rack Loaded Into Position 1

Second Full Rack Raised To Position 4 - "Pre - State Position"

CART LOADER/UNLOADER AND A SWITCHER SYSTEM

FIELD OF THE INVENTION

The present invention relates to industrial cart systems, and more particularly, to industrial cart loading/unloading and a cart switching system.

BACKGROUND OF THE INVENTION

In the art, forklifts are typically used to deliver or move materials, for example, palletized loads, or loads contained in bins, in a factory or other industrial plant.

For mass manufacturing, the industry typically utilizes an assembly line configuration wherein a product, for example, an automobile, is assembled or built in a sequence of operations performed at stations configured along the assembly line. To support the continuous operation of the assembly line, parts or components must be replenished continuously and in a timely manner. Since there are space restrictions for the stations along the assembly line, the parts or components cannot be stock piled and must be restocked in near real-time and prior to demand. It will be appreciated that this places a high premium on logistical control and movement of parts within the manufacturing facility and bottlenecks in the supply of fresh parts or components can arise.

Accordingly, there remains a need for improvements in the art.

BRIEF SUMMARY OF THE INVENTION

The present invention is directed to an industrial cart loading/unloading and a switcher system.

According to an embodiment, the present invention comprises a cart switcher system comprising: a base member having a loading end and an operator end; a first carriage for carrying a bin, said first carriage being operatively coupled to said base member and configured to move between said loading end and said operator end; a second carriage for carrying another bin; a bypass mechanism configured to support said second carriage and said other bin; said bypass mechanism being operatively coupled to said base member and configured to move between said loading end and said operator end; and said bypass mechanism being further configured to operate in a bypass mode, and in said bypass mode said bypass mechanism being operable to permit movement of said first carriage and said bin between said loading end and said operator end.

According to another embodiment, the present invention comprises a rack loader/unloader and switcher system comprising: a base having a loading end and an operator side end, and said base including a first track and a second track; a first carriage configured for carrying a rack, said first carriage being operatively coupled to move on said first track; a controller; a first drive mechanism operatively coupled to said first carriage for moving said first carriage between said loading end and said operator side end, and said first drive mechanism being responsive to one or more control signals from said controller for controlling movement of said first carriage between said loading end and said operator end; a second carriage configured for carrying another rack; a travel lift mechanism configured to support said second carriage and said other rack, said travel lift mechanism being operatively coupled to move on said second track; a second drive mechanism operatively coupled to said travel lift mechanism for moving said travel lift mechanism between said loading end and said operator side end, and said second drive mechanism being responsive to one or more control signals from said controller for controlling movement of said travel lift mechanism between said loading end and said operator end; said travel lift mechanism further including a lift drive mechanism operatively coupled to said second carriage, said lift drive mechanism being responsive to one or more control signals from said controller for controlling movement of said second carriage between a lowered position and a raised position; and wherein in said raised position, said travel lift mechanism is configured to allow movement of said first carriage on said first track under said second carriage and between said loading end and said operator side end.

Other aspects and features of the present invention will become apparent to those ordinarily skilled in the art upon review of the following description of embodiments of the invention and/or the accompanying figures.

BRIEF DESCRIPTION OF THE DRAWINGS

Reference will now be made to the accompanying drawings which show, by way of example, embodiments of the present invention, and in which.

In the drawings, like reference numerals indicated like components or elements.

DETAILED DESCRIPTION OF THE EMBODIMENTS OF THE INVENTION

Figure 1:
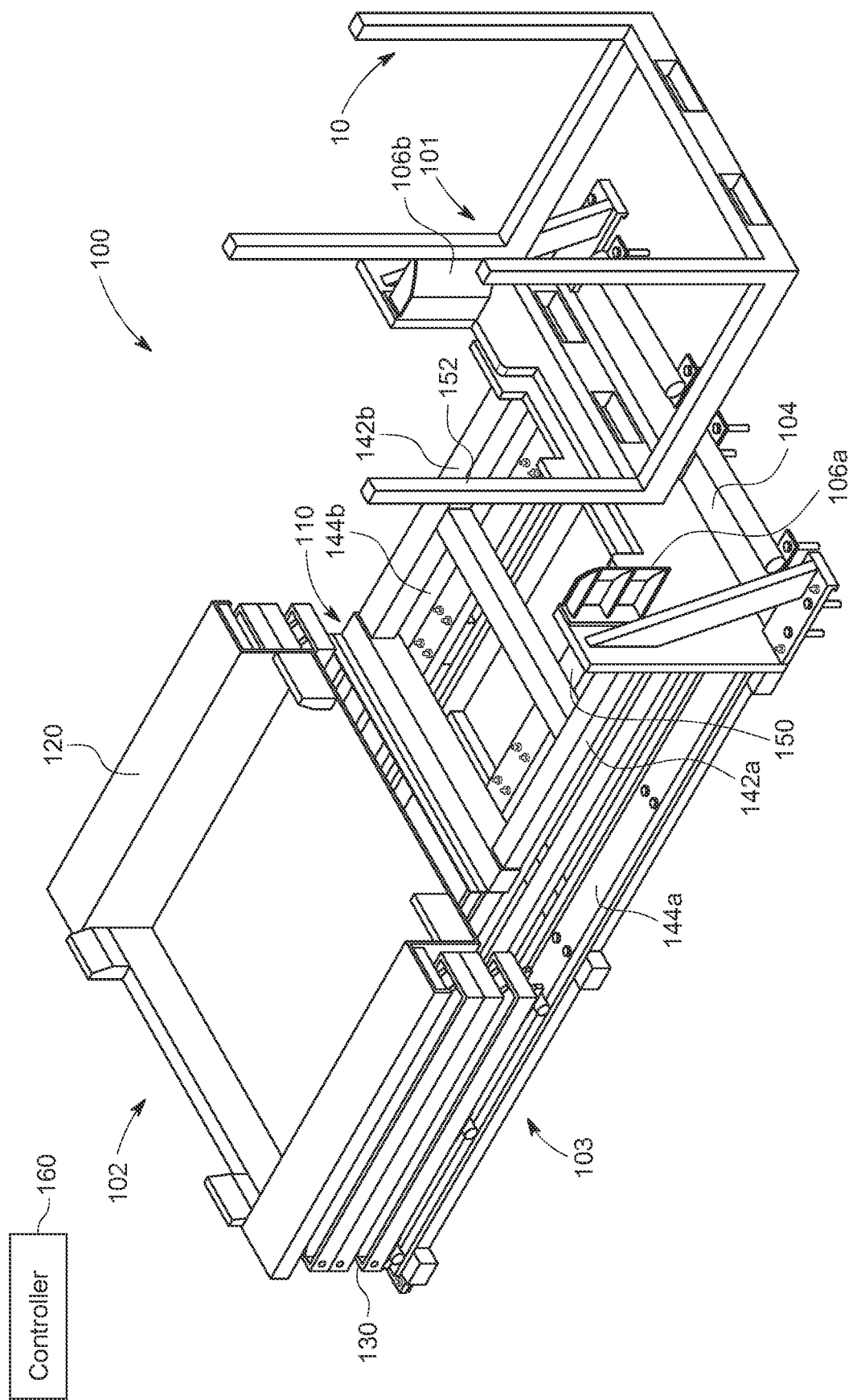
FIG. 1 shows in diagrammatic form a cart or rack loader/unloader and switcher system according to an embodiment of the present invention with a rack or bin ready for loading at a forklift loading stage or side.

Reference is first made to FIG. 1, which shows a rack or bin cart loader/unloader and switcher system according to an embodiment of the present invention and indicated generally by reference 100. According to an embodiment, the rack loader/unloader and switcher system 100 comprises a support base or member 103, a first transfer carriage 110, a second transfer carriage 120, and a lift mechanism 130. The second transfer carriage is coupled to and carried by the lift mechanism 130. In an exemplary implementation, the support base includes one or more rails or tracks 140, indicated individually by references 142a and 142b, for a dual rail or track arrangement, configured to support and/or guide the first transfer carriage 110 between a loading/unloading position or stage indicated generally by reference 101 and an operator side or line position or stage indicated generally by reference 102, in FIG. 1. The support base includes one or more rails or tracks 144, indicated individually by references by 144a and 144b configured to support and guide the lift mechanism 130 back and forth between the loading/unloading stage 101 and the operator side or line position 102, for example, in a generally horizontal plane as will be described in more detail below.

Referring still to FIG. 1, the switcher system 100 includes a drive mechanism for the first transfer carriage 110 indicated generally by reference 150. According to an exemplary implementation, the drive mechanism 150 comprises a hydraulic actuator, or a belt drive, configured to move the first transfer carriage 110 on the rails 142 back and forth between the loading/unloading position 101 and the operator side position 102. The drive mechanism 150 may be implemented using other types of drive motors or actuators, for example, a motor and a worm-gear drive. Similarly, the switcher system 100 includes a drive mechanism for the lift mechanism 130 and indicated generally by reference 152. The drive mechanism is configured to move the second transfer carriage 120 on the rails 142 and in an elevated position back and forth between the loading/unloading position 101 and the operator side position 102. The drive mechanism 152 may be implemented using other types of drive motors or actuators, for example, a motor and a worm-gear drive. In the context of the present description, the travel lift mechanism comprises the second transfer carriage 120 and the lift mechanism 130.

Figure 14:
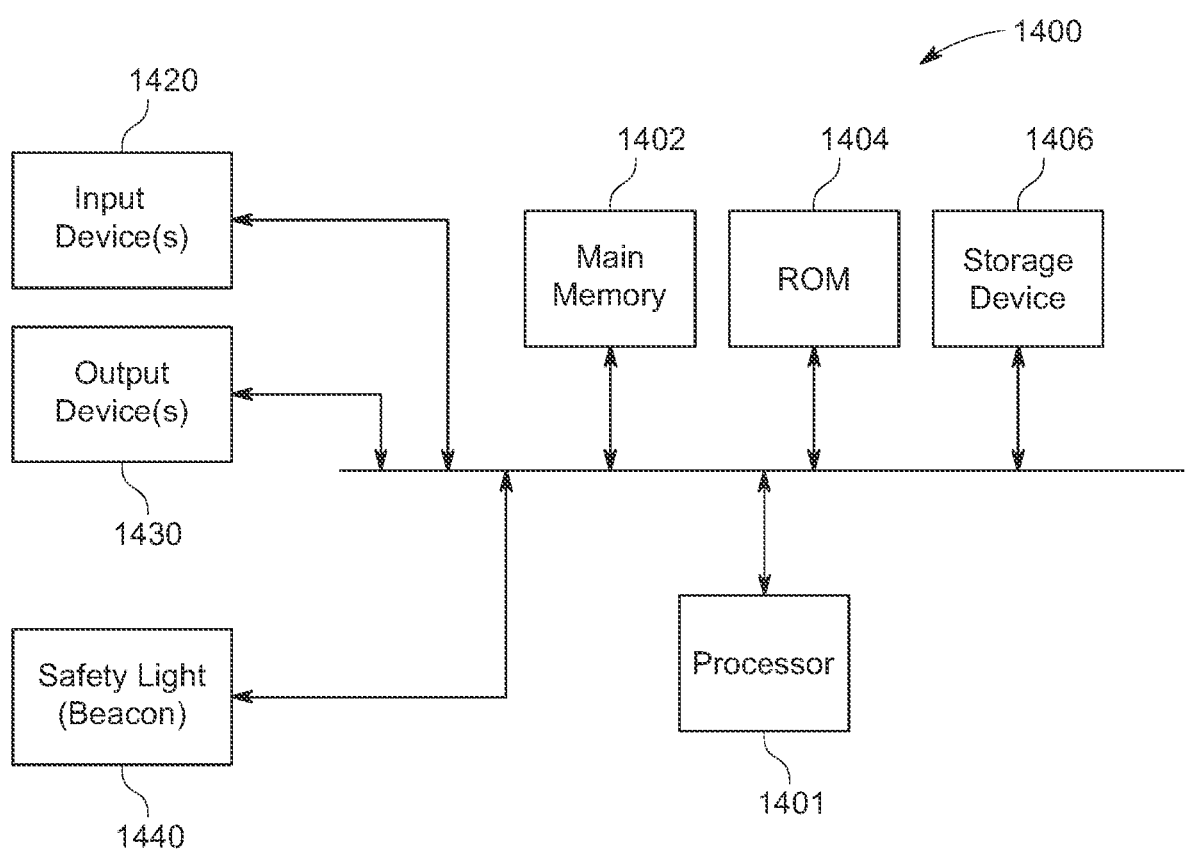
FIG. 14 shows in block diagram form an exemplary configuration for a controller or control module for the switcher system suitable for implementing the functional and operational control of the system according to embodiments of the present invention.

As also shown in FIG. 1, the rack loader/unloader and switcher system 100 includes a controller indicated generally by reference 160. The controller 160 comprises a programmable logic device, or a microprocessor-based device programmed to operate under stored-program control, to provide the functionality and operational control of the switcher system 100 as described herein. The controller 160 may be implemented with a configuration as shown in FIG. 14. According to another embodiment, or implementation, the controller comprises a relay logic system, e.g. a relay logic controller and/or relay logic board, coupled to the relay (switches and/or sensors or other compatible input devices) devices as described above the particular hardware implementation details, and/or software programming, and/or logic or relay logic function details, will be within the understanding of those skilled in the electronic hardware, logic control circuits, relay logic control, and programming arts.

As shown in FIG. 1, the loader/unloader and switcher system 100 may also include a protection plate indicated by reference 104 at the end of the base on the loading/unloading side 101. The base 103 may further include forklift guides 106, indicated individually by references 106a and 106b.

Figure 2:
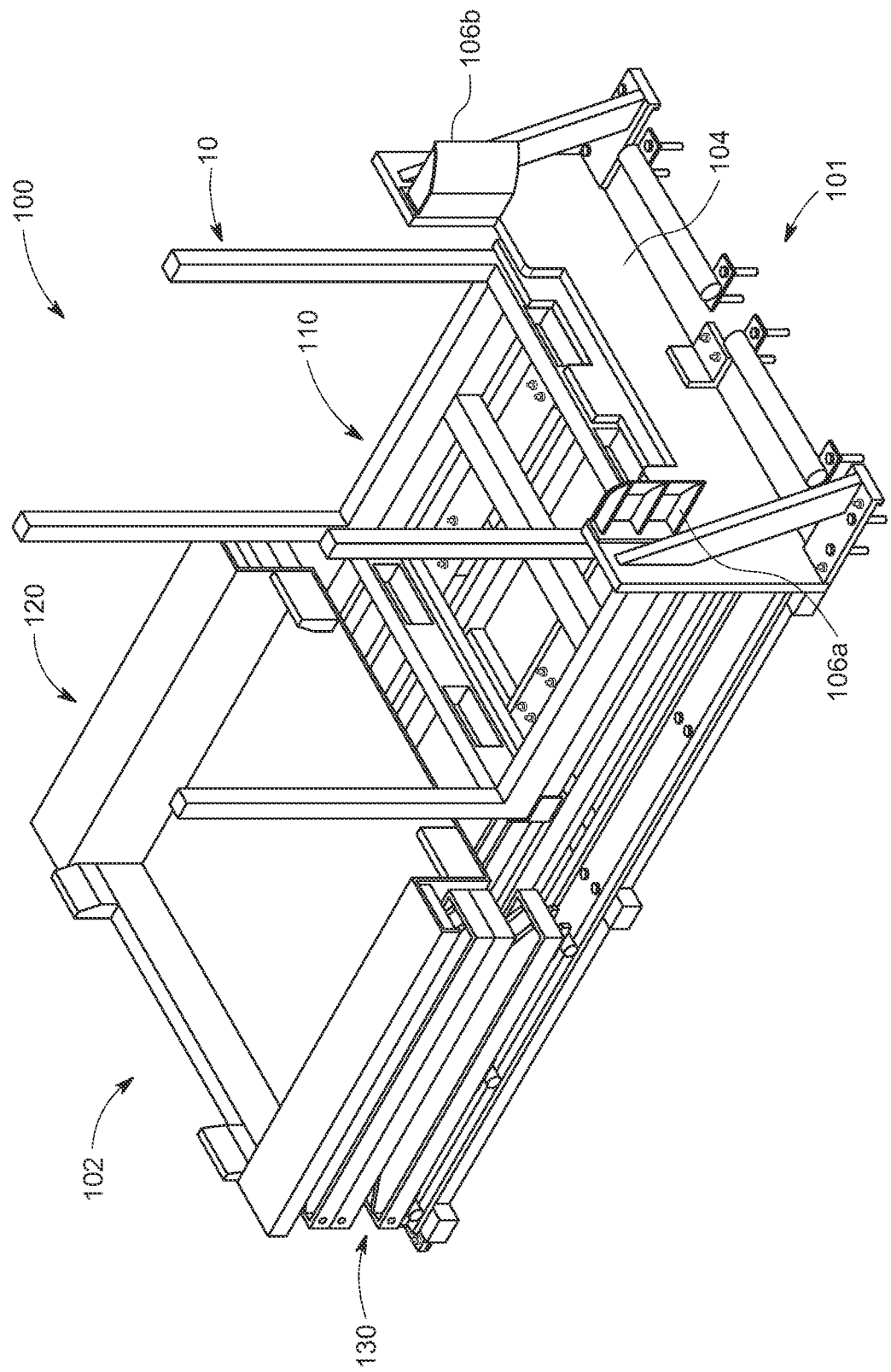
FIG. 2 shows the cart or rack loader/unloader and switcher of FIG. 1 with a rack or bin loaded or positioned on the first transfer carriage of the switcher.

Reference is next made to FIG. 2, which shows the rack loader/unloader and switcher system 100 with a rack or bin 10 loaded or positioned on the first transfer carriage 110. The bin(s) 10 (11) may comprise a bin or a rack loaded with parts or components, or a cart loaded with parts or components. In the context of the present description, the rack 10 is loaded with parts or components utilized on an assembly line in an automobile manufacturing facility or application. As also shown, the lift mechanism 130 is in a lowered or retracted position which provides an operator, e.g. an assembly line worker, access to the rack or bin loaded on the second transfer carriage 120 which located on the operator or line side 102 of the switcher 100.

Figure 3:
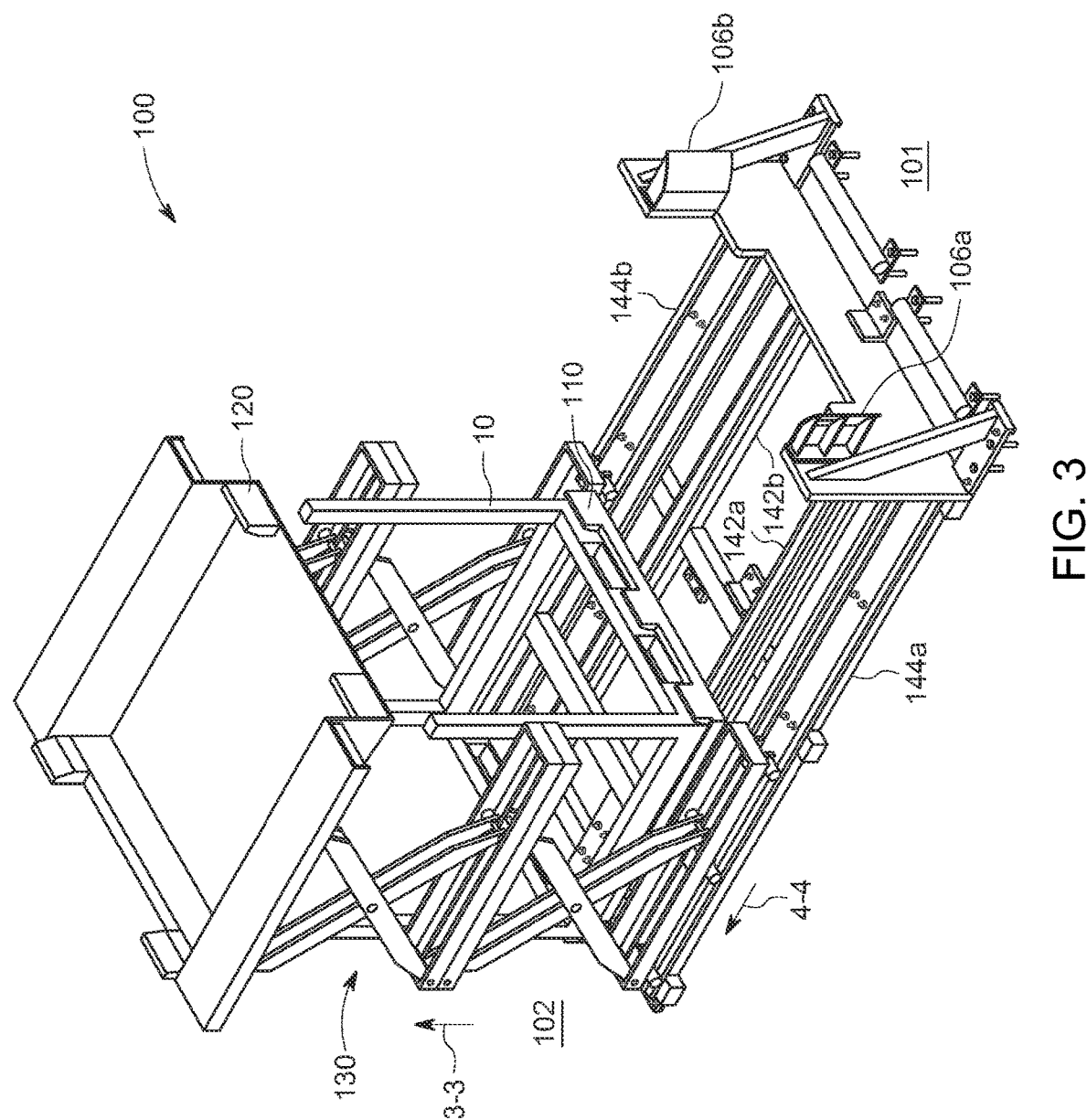
FIG. 3 shows the cart or rack loader/unloader and switcher of FIG. 2 with the second transfer carriage and the travel lift mechanism in an extended or raised position or condition at the operator line side.
Figure 4:
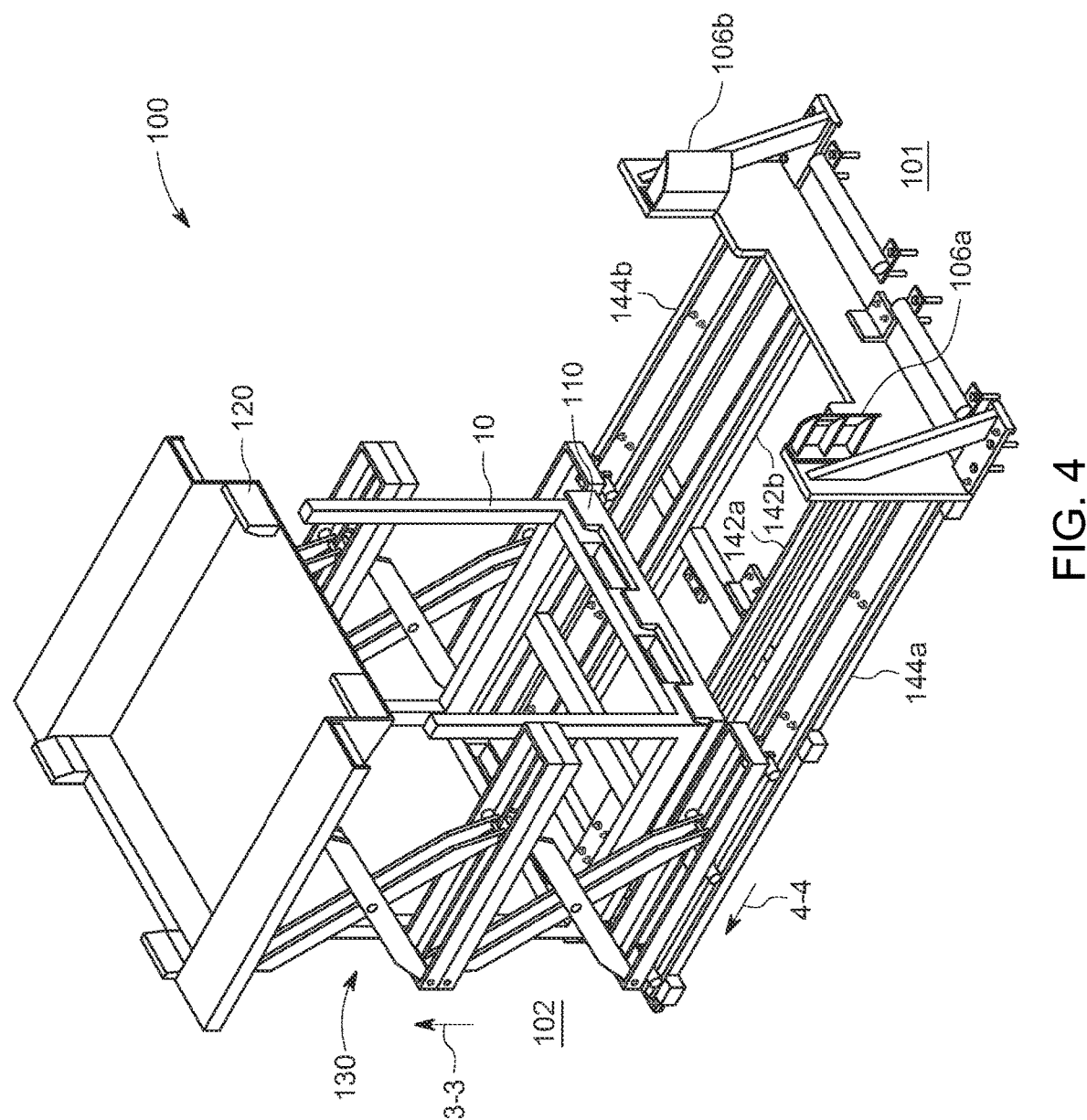
FIG. 4 shows the cart or rack loader/unloader and switcher of FIG. 3 in with the first transfer carriage and the loaded rack moved to the operator line side and the second transfer carriage maintained in a raised or elevated position at the operator line side.

Reference is made to FIG. 3, which shows the loader/unloader and switcher system 100 with a travel lift mechanism 130 in an extended or raised position or condition, at the operator line side 102, as indicated by arrow 3-3. With the second transfer carriage 120 in a raised position at the operator line side 102, the first transfer carriage 110 with a loaded rack or a new rack can be moved into position at the operator line side 102 as shown in FIG. 4, and indicated by arrow 4-4. It will be appreciated that the configuration of the switcher 100 according to this embodiment provides the capability to move or manipulate two racks or bins in the same footprint between the loading/unloading side 101 and the operator line side 102. For instance by effectively utilizing the available vertical or height clearance normally available at the assembly line station. It will be further appreciated that since floor space alongside an assembly line or automated manufacturing facility is typically limited, the capability to handle two containers simultaneously or sequentially is advantageous, and can serve to prevent bottlenecks arising from delayed delivery of parts or components.

Figure 5:
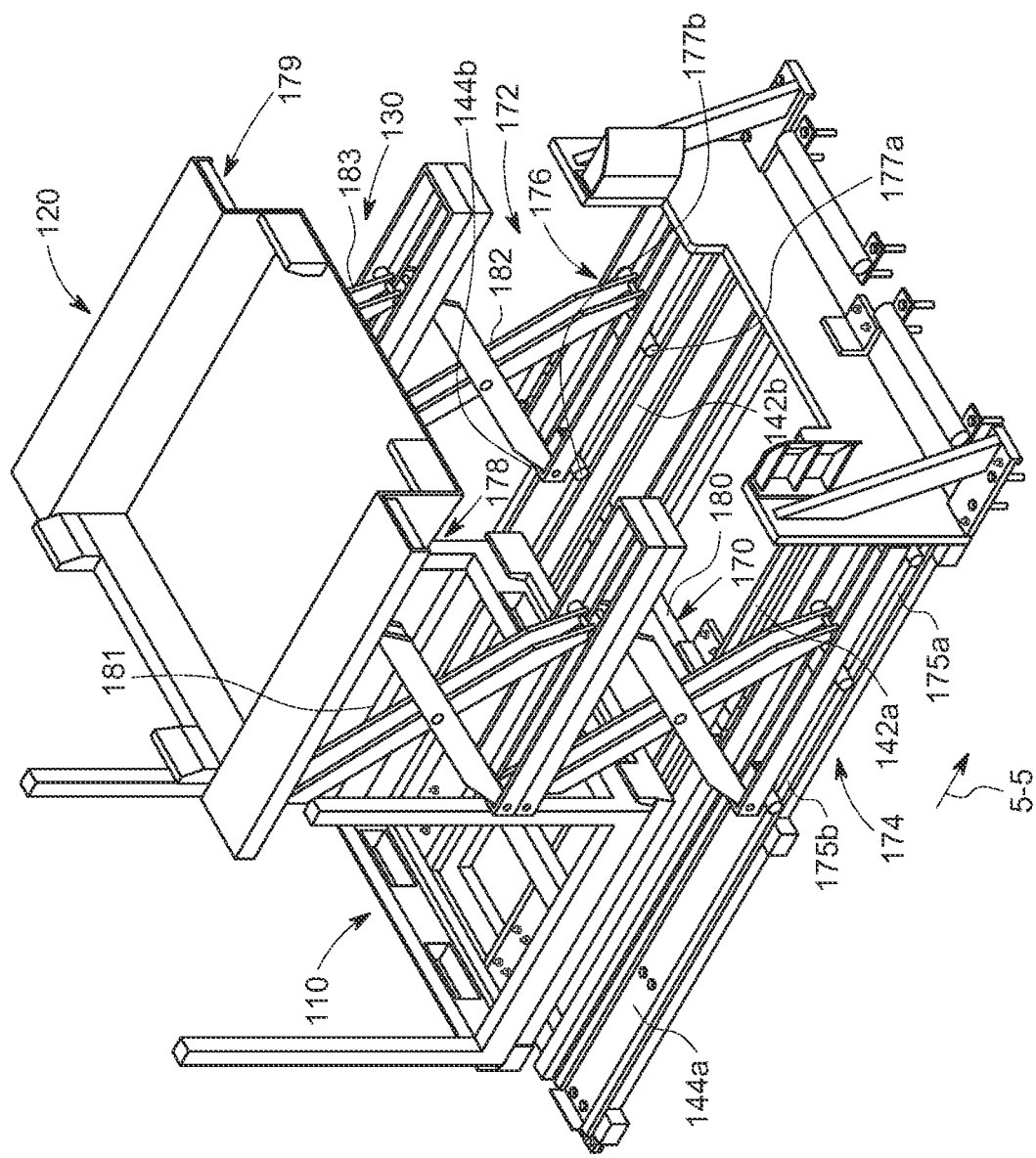
FIG. 5 shows the cart or rack loader/unloader and switcher of FIG. 4 with the second transfer carriage moved to the forklift loading side and maintained in a raised or elevated position by the travel lift mechanism.
Figure 6:
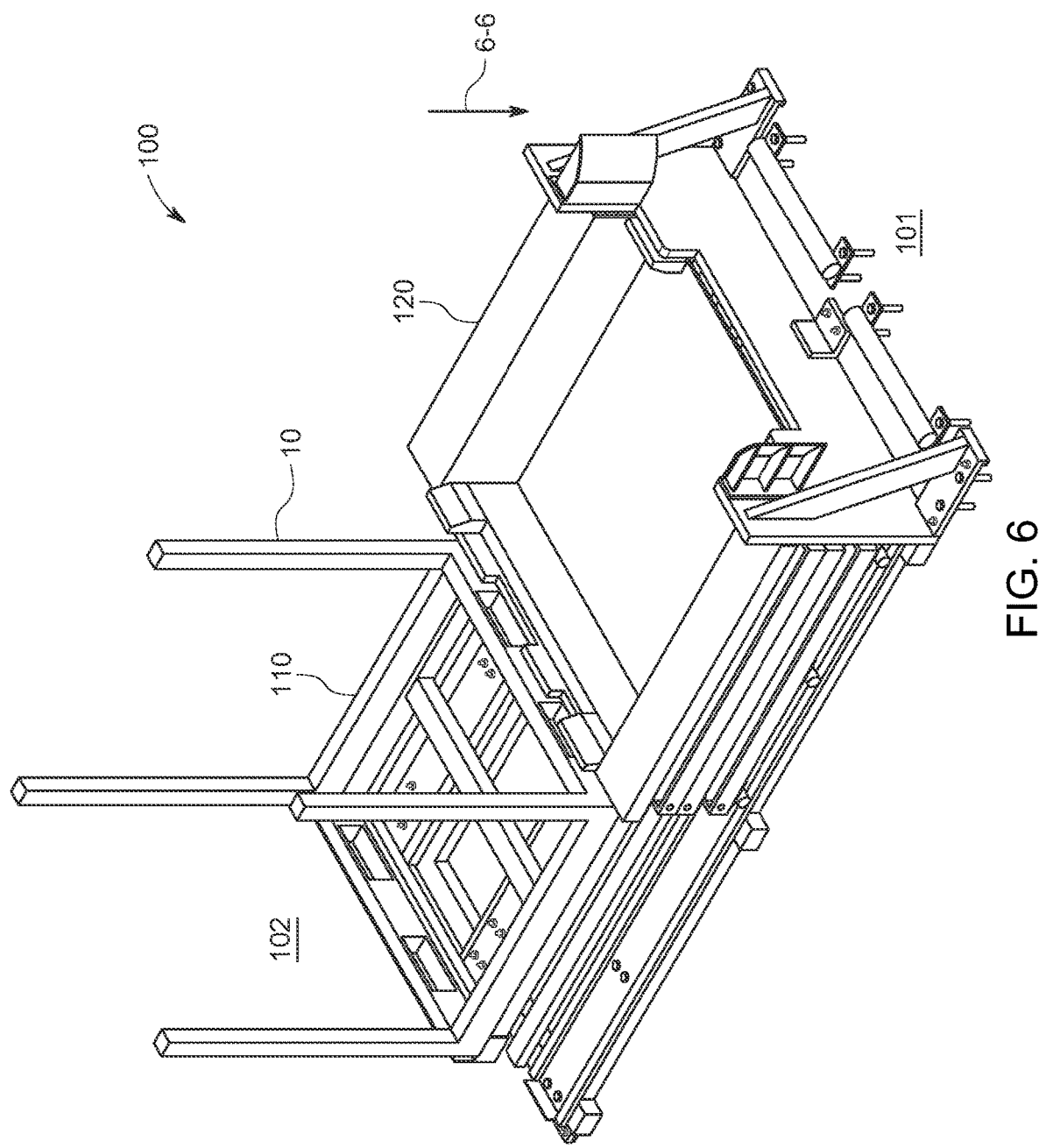
FIG. 6 shows the cart or rack loader/unloader and switcher system of FIG. 5 with the second transfer carriage lowered by the travel lift mechanism to a lower position for unloading an empty rack on the carriage at the forklift loading/unloading side or station.
Figure 7:
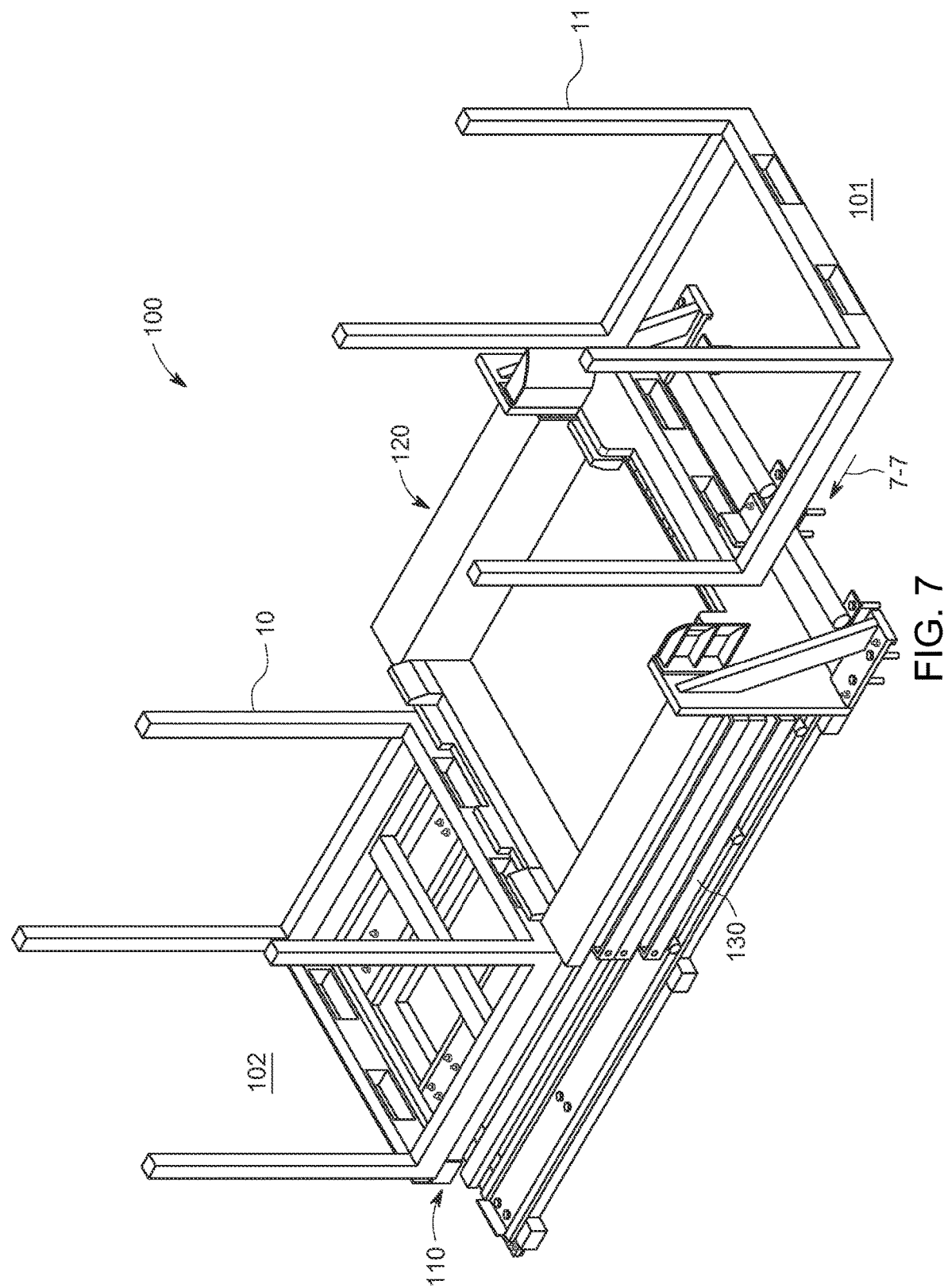
FIG. 7 shows the cart or rack loader/unloader and switcher system of FIG. 6 with a new or full rack ready for loading onto the second transfer carriage at the forklift loading/unloading side or station.
Figure 8:
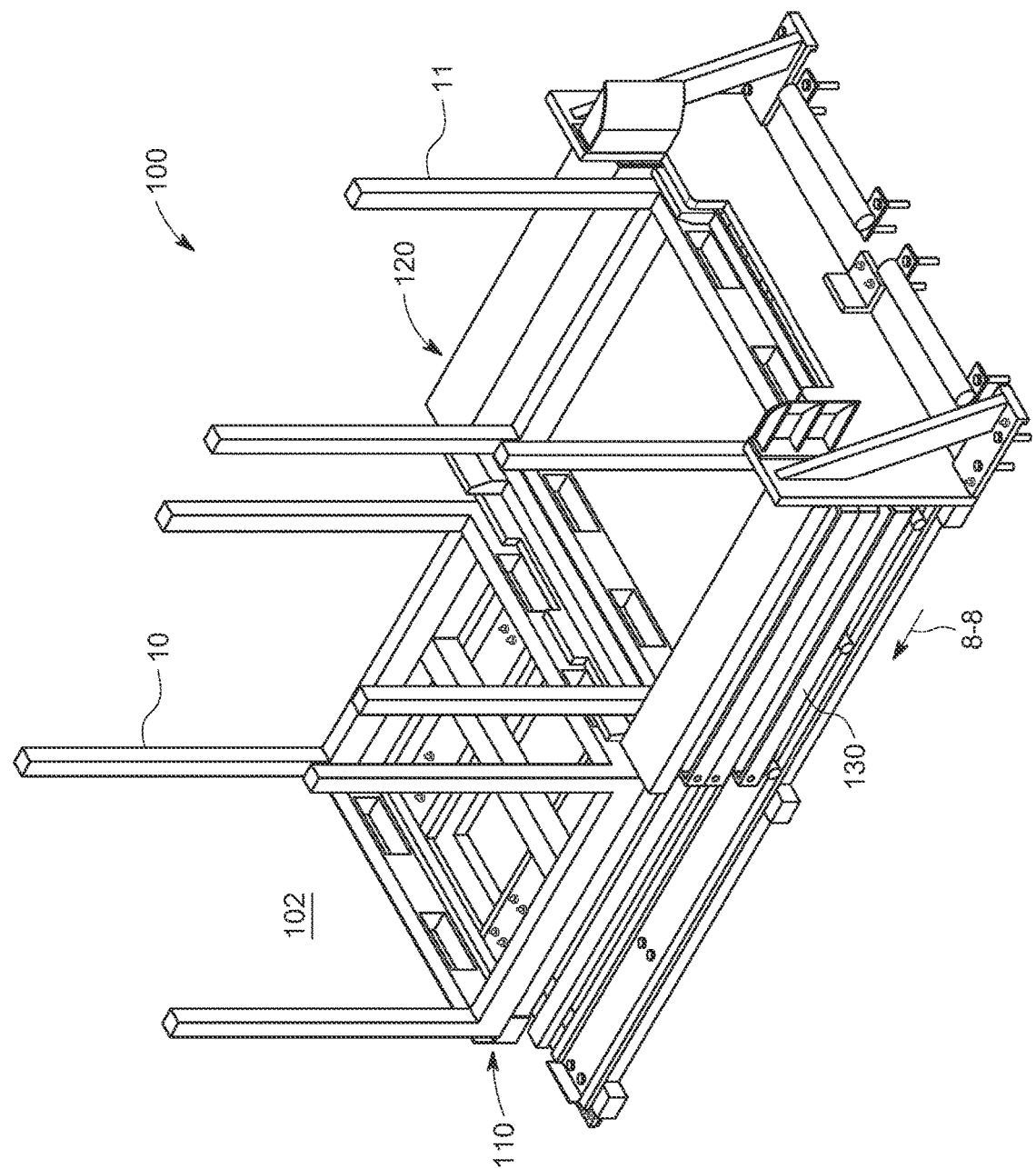
FIG. 8 shows the cart or rack loader/unloader and switcher system of FIG. 7 with the new rack (full) loaded onto the second transfer carriage at the forklift loading/unloading side.
Figure 9:
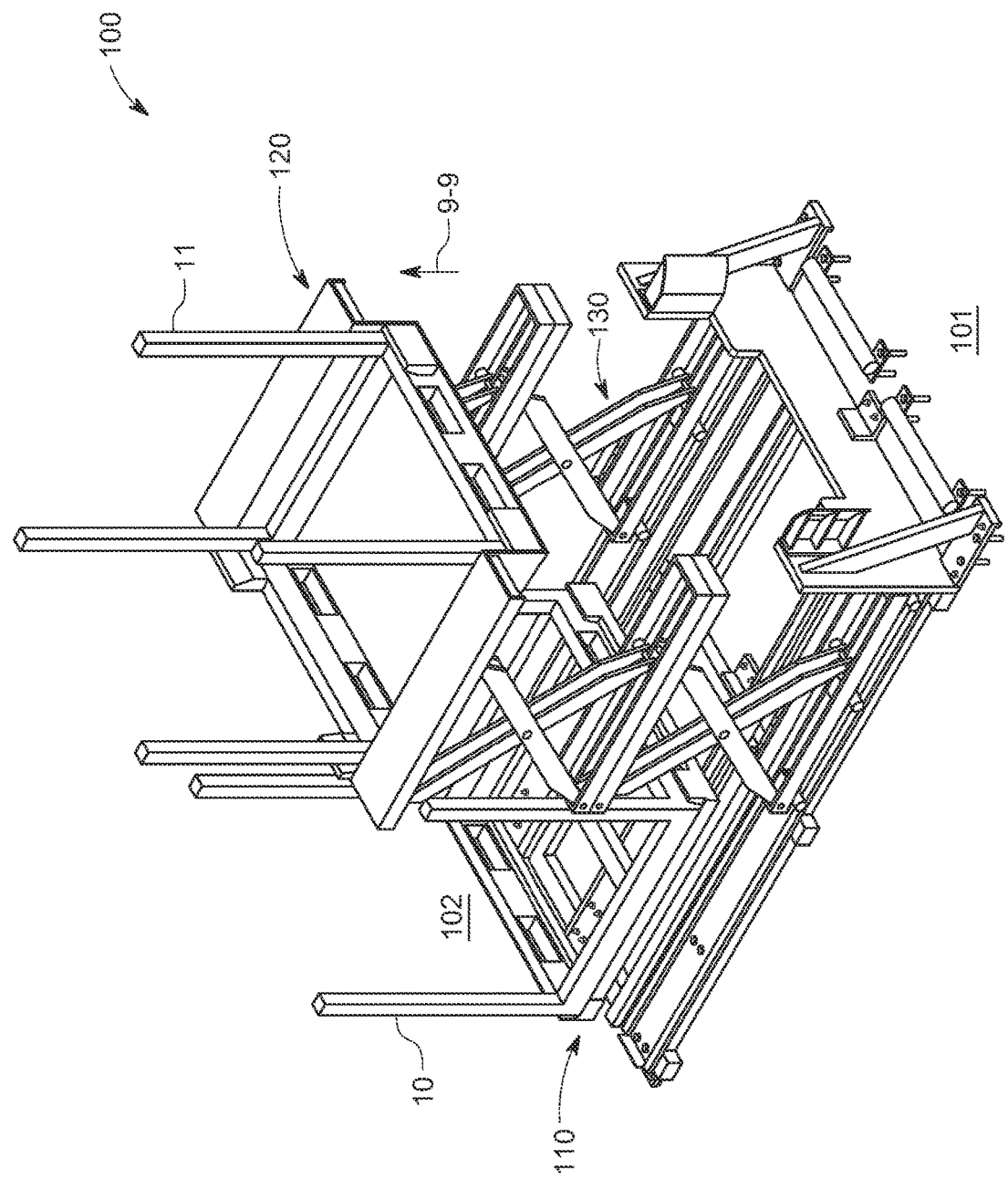
FIG. 9 shows the cart or rack loader/unloader and switcher system of FIG. 8 with second transfer carriage and loaded rack raised to elevated or vertical position by the travel lift mechanism.
Figure 10:
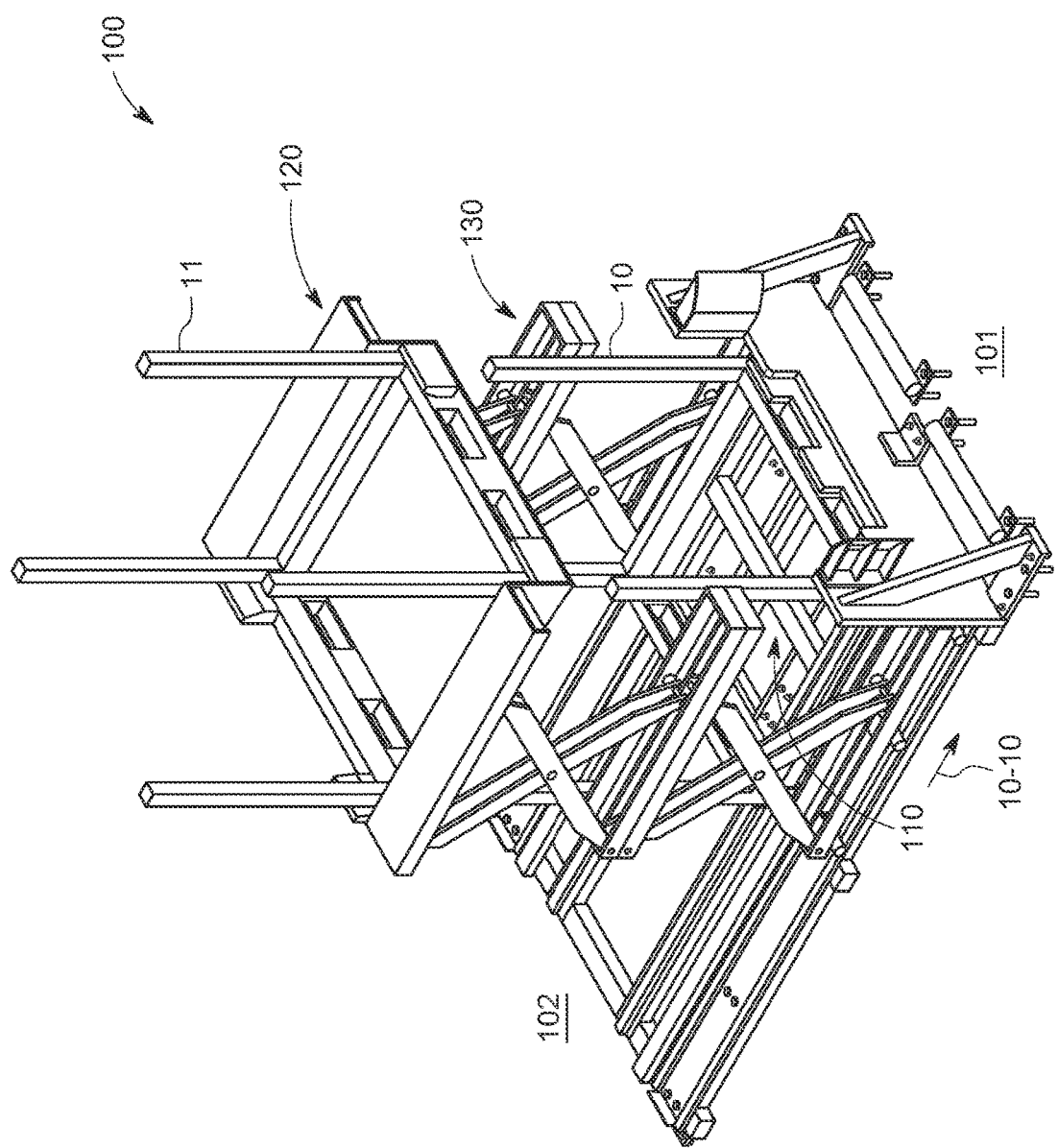
FIG. 10 shows the cart or rack loader/unloader and switcher system of FIG. 9 with the first transfer carriage moved to the forklift loading/unloading side and in a position below the travel lift mechanism to allow unloading of the rack (empty) from the first transfer carriage.

Reference is next made to FIG. 5, which shows the rack loader/unloader and switcher 100 with the travel lift mechanism 130 moved to the loading/unloading side 101, as indicated by arrow 5-5, and the second transfer carriage 120 in a raised or elevated position with the lift mechanism 130 in an extended or raised position. The second transfer carriage 120 is then lowered by the lift mechanism 130 at the loading/unloading side 101, as indicated by arrow 6-6 in FIG. 6. With the second transfer carriage 120 in a lowered position, an empty bin or rack can be unloaded, for example, using a forklift, and/or a loaded rack 11 (e.g. a bin, a rack or a cart) can be positioned for loading shown in FIG. 7 and indicated by arrow 7-7, and then loaded onto the second transfer carriage 120 as shown in FIG. 8, as indicated by arrow 8-8. The lift mechanism 130 is then actuated (for example, under the control of the controller 160 as described in more detail below), to raise the second transfer carriage 120 with the newly loaded rack or bin 11 to an elevated position as indicated by arrow 9-9 in FIG. 9. In the elevated position, the second transfer carriage 120 can be moved by the travel lift mechanism 130 over the rack or bin 10 loaded on the first transfer carriage 110, and/or the first transfer carriage 110 with the rack 10 can be moved under the elevated second transfer carriage 120, either substantially simultaneously or in sequence. As shown in FIG. 10, the first transfer carriage 110 with an empty rack 10 is moved from the operator line 102 to a position underneath the second transfer carriage 120 at the loading/unloading side 101, as indicated by arrow 10-10.

As also shown in FIG. 5, the lift mechanism 130 comprises a pair of scissor lift mechanisms indicated individually by references 170 and 172. Each scissor lift mechanism 170 and 172 has a base indicated by references 174 and 176, respectively, and an upper shelf or support section, indicated by references 178 and 179, respectively. The base 174 of the first scissor lift mechanism 170 is configured to couple to and ride the rail(s) 144a, and may comprise one or more rollers 175, indicated individually by references 175a, 175b. Similarly, the base 176 of the second scissor lift mechanism 172 is configured to couple to and ride the rail(s) 144b, and may comprise one or more rollers 177, indicated individually by references 177a, 177b. Each of the upper support sections 178, 179 is configured to support and attach a respective side or section of the second transfer carriage 120 as also shown in FIG. 5. The drive mechanism 152 is operatively coupled to the base 174 and/or the base 176 and configured to move the second transfer carriage 120 and the lift mechanism 130, i.e. the travel lift mechanism, back and forth between the loading/unloading station 101 and the operator side station 102 under the control of the controller 160 as described in more detail below.

Figure 11:
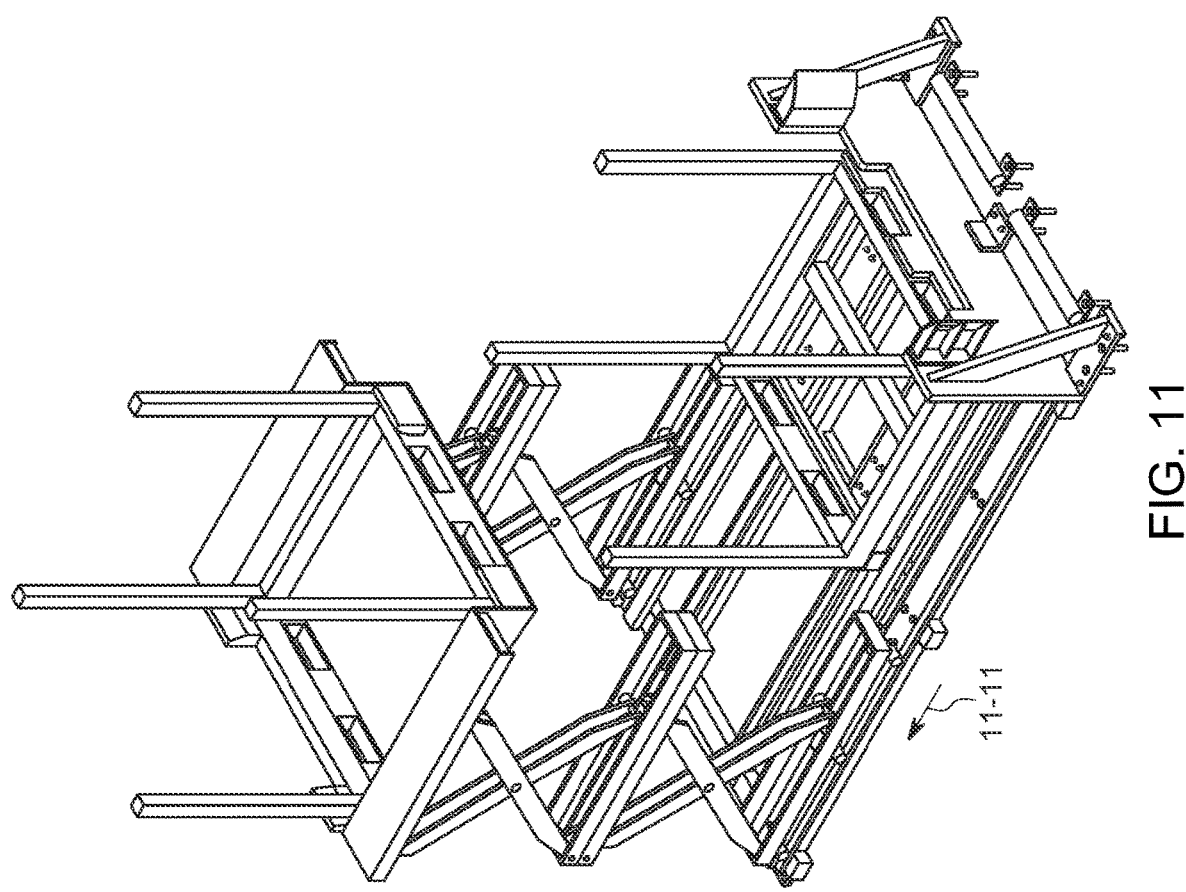
FIG. 11 shows the cart or rack loader/unloader and switcher system of FIG. 10 with second transfer carriage and loaded rack moved by the travel lift mechanism to the operator line side.
Figure 12:
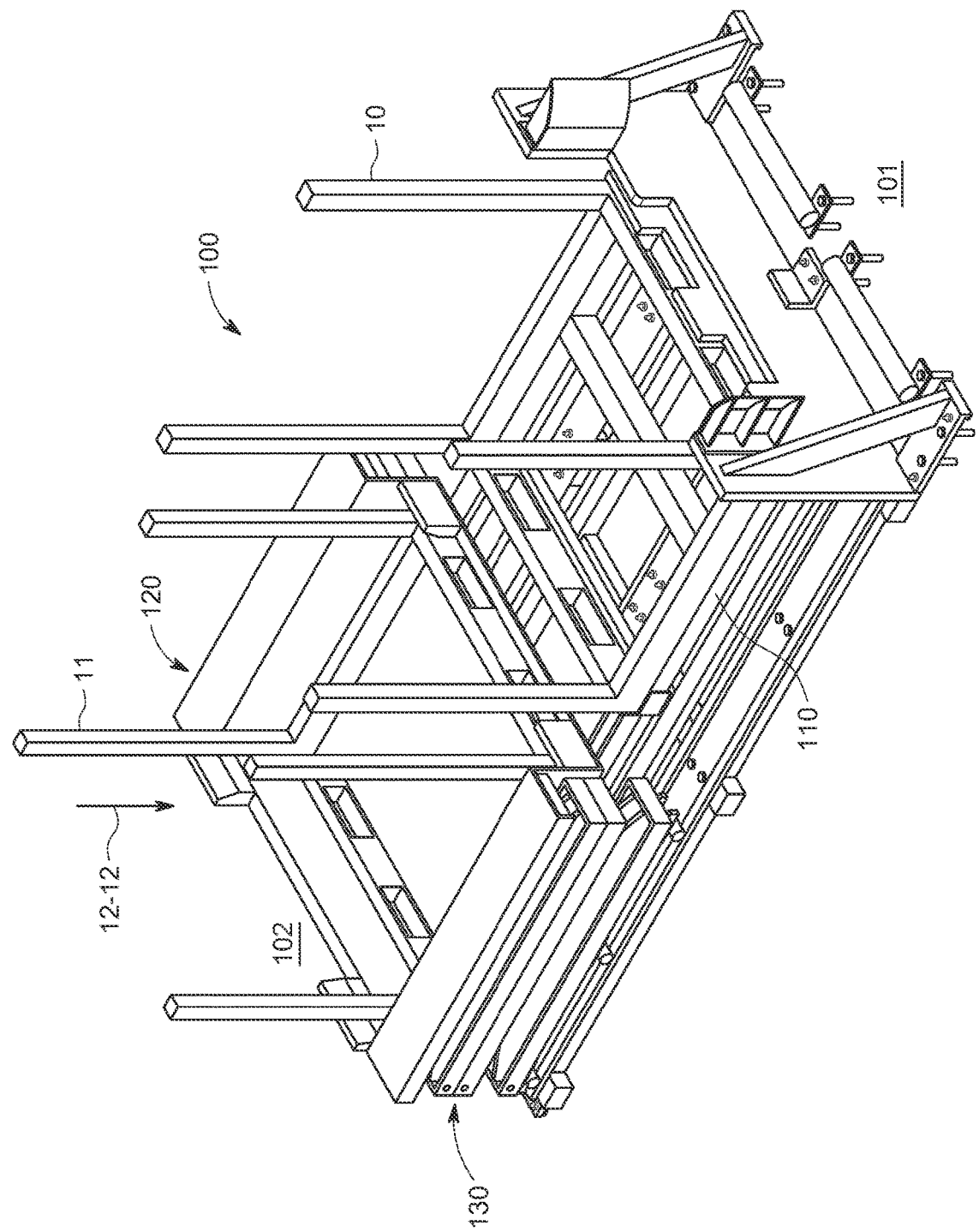
FIG. 12 shows the cart or rack loader/unloader and switcher of FIG. 11 with the second transfer carriage lowered by the travel lift mechanism to a lower position to provide access to the rack for an operator at the operator line side or station.

According to an exemplary implementation, each scissor lift mechanism 170, 172 comprises two scissor lift mechanisms in a vertical or stacked configuration. As shown in FIG. 5, the scissor lift mechanism 170 comprises a lower scissor lift mechanism indicated by reference 180 and an upper scissor lift mechanism indicated by reference 181. The configuration of the two scissor lift mechanisms 180, 181 provides the lift mechanism with a greater range of vertical movement within a narrower horizontal footprint or template. The lower scissor lift mechanism 180 comprises the base 174 which is coupled to the rail(s) 144a as described above. The upper scissor lift mechanism 181 comprises the upper shelf or support section 178 which is connected to the second transfer carriage 120. The scissor lift mechanisms 180 and 181 are coupled together and are configured with individual drive lift mechanisms or a single drive mechanism for the scissor lift mechanism 170. The drive lift mechanism may comprise a hydraulic actuator configured to open/close, i.e. extend and retract, the scissor lift mechanism 170 to raise and lower the second transfer carriage 120 under the control of the controller 160 as described in more detail herein. Similarly, the scissor lift mechanism 172 comprises a lower scissor lift mechanism indicated by reference 182 and an upper scissor lift mechanism indicated by reference 183. The lower scissor lift mechanism 182 comprises the base 176 which is coupled to the rail(s) 144b as described above. The upper scissor lift mechanism 183 comprises the upper shelf or support section 179 which is connected to the second transfer carriage 120. The scissor lift mechanisms 182 and 183 are coupled together and are configured with individual drive lift mechanisms or a single drive lift mechanism for the scissor lift mechanism 172 in a manner similar to the scissor lift mechanism 172. Then as shown in FIG. 11, the elevated second transfer carriage 120 and loaded rack 11 is moved by the travel lift mechanism 130 to the operator side 102, as indicated by arrow 11-11. As shown in FIG. 12 and indicated by arrow 12-12, the second transfer carriage 120 is lowered by the lift mechanism 130, and the loaded rack 11 is accessed at the operator side 102 by an assembly line worker.

Reference is next made to FIGS. 13A to 13J which shows a sequence of operations for a rack loader/unloader and switcher system according to an embodiment of the invention and indicated generally by reference 1300. The rack loader/unloader and switcher system 1300 may be implemented in a manner similar to the rack loader/unloader and switcher system 100 described above and comprises a first transfer carriage indicated by reference 1310 and a second transfer carriage 1320 with a lift mechanism indicated by reference 1322.

Figure 13A:
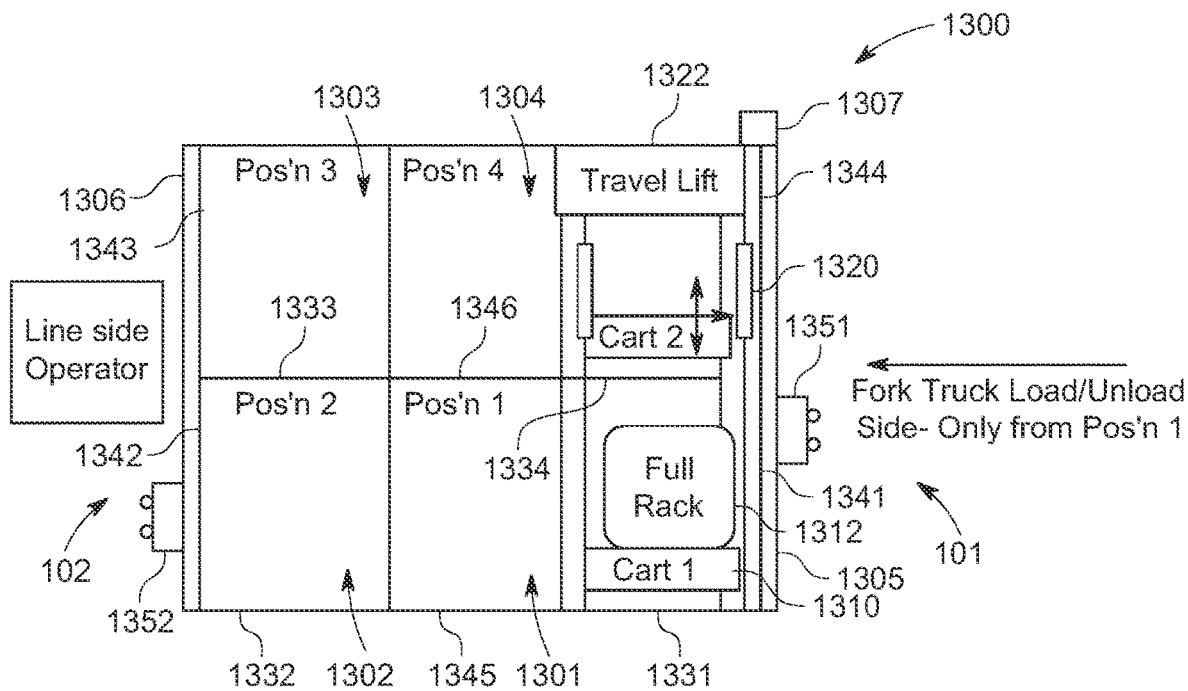
FIG. 13A shows an exemplary sequence of operations for the rack loading and switcher system with a first loaded rack in "Position 1"

As shown in FIG. 13A, the rack loader/unloader and switcher 1300 comprises a loading station or side indicated by reference 101 and an operator or line side indicated by reference 102. The loading station or side 101 is configured for loading and unloading a rack 1312, comprising, for example, a bin, rack, or pallet, loaded with materials, parts or other components, required at the operator side, e.g. an assembly worker at a station on an automobile assembly. The cart(s) are loaded/unloaded at the loading station 101 using a forklift, other lifting and transport mechanism or machine.

As shown in FIG. 13A, the rack loader/unloader and switcher system 1300 is configured to operate in four positions or states comprising "Position 1" indicated by reference 1301, "Position 2" indicated by reference 1302, "Position 3" indicated by reference 1303, and "Position 4" indicated by reference 1304. The first transfer carriage 1310 is configured to move between Position 1 and Position 2, for example, along a pair of rails or tracks with an actuator, e.g. a motor and/or drive shaft, or a hydraulic drive shaft, similar to the implementation described above. The switcher system 1300 includes a controller, e.g. the controller 160 comprising a programmable device (or relay logic controller or board), configured to control and monitor the components and elements in the operation of the system as described herein. The particular implementation details the controller 160 are described in more detail below and also will be readily within the understanding of those skilled in the art.

Referring again to FIG. 13A, the rack loader/unloader and switcher system 1300 may further include one or more safety sensors or devices or relay logic sensor and/or output devices According to an exemplary, the rack loader/unloader and switcher 1300 comprises a loading side safety sensor indicated by reference 1305 and an operator side safety sensor indicated by reference 1306. The loading side safety sensor 1305 is implemented as a "light curtain", for instance, comprising an LED and photosensor array configured with circuitry or logic control to generate an alarm. Similarly, the operator or line side safety sensor 1306 is also implemented as a light curtain configured to generate an alarm. According to an exemplary implementation and embodiment, the loading side safety sensor 1305 is configured to generate an alarm and a cycle-stop condition if the light curtain 1305 is breached during any movement of the first transfer carriage 1310, and/or the second transfer carriage 1320, and/or the lift mechanism 1322. Similarly, the operator side safety sensor 1306 is configured to generate an alarm and a cycle-stop condition if the light curtain 1306 is breached during any movement of the first transfer carriage 1310, and/or the second transfer carriage 1320, and/or the lift mechanism 1322. According to another aspect, the rack loader/unloader and switcher system 1300 includes a safety light indicator 1307, for example, a fork light beacon, which is mounted in a visible location at the loading station or side 101. According to an exemplary implementation, the safety light indicator 1307 is configured to illuminate green for a "Clear to Enter" state when it is safe for a fork lift operator to load/unload a cart or rack from the switcher 1300; and to illuminate red for "Not Clear to Enter" state to indicate that it is not safe for a fork lift driver to load/unload a cart or rack. According to another aspect, the safety light indicator is configured to flash green and red to indicate that the loading side, i.e. the fork-lift side, light curtain 1305 has been breached (for instance as described above). According to another aspect, the safety light indicator 1307 is configured to illuminate white to indicate a "Rack Loaded Correctly" state when the cart or rack is properly loaded on the transfer carriage 1310 or 1320.

An exemplary sequence of operations a load and unload cycle is now described with reference to FIGS. 13A to 13J.

As shown in FIG. 13A, the safety light or beacon 1307 is configured to show Green indicating "Clear to Enter" condition for the fork-lift operator. The first transfer carriage 1310 is located at "Position-1" indicated by reference 1301. The fork-lift (or other loading machine or mechanism) loads a bin or rack (full of parts or components) on the first transfer carriage 1310 located at "Position-1" 1301. The switcher system 1300 may include a "Position-1" detect or proximity sensor, or relay logic sensor, indicated by reference 1331 configured to detect when the transfer carriage 1310 or 1320 is properly positioned or seated in Position-1 in the switcher 1300. As shown, the second transfer carriage 1320 and the lift mechanism 1322 are positioned or moved to Position-4 as indicated by reference 1304. In Position-4, the lift mechanism 1322 is extended to position the second transfer carriage 1320 above the first transfer carriage 1310, which as will be described in more detail below allows the first transfer carriage 1310 to effectively move from Position-1 1301 to Position-2 1302 under the second transfer carriage 1320. The switcher system 1300 may include a Position-3 detect sensor (or using a relay logic sensor) indicated by reference 1333 configured to detect when the second transfer carriage 1320 is properly positioned or seated in Position-3 in the switcher 1300.

Referring still to FIG. 13A, the switcher 1300 may include a Position-4 detect or proximity sensor (or relay logic sensor or output device) indicated by reference 1334 configured to detect when the transfer carriage 1310 or 1320 is properly positioned or seated in "Position-4" 1304. The switcher 1300 may further include "slow-down" sensors (or relay logic sensors or output devices) comprising a Position-1 slow-down sensor 1341, a Position-2 slow-down sensor 1342, a Position-3 slow-down sensor 1343 and/or a Position-4 slow-down sensor 1344. The slow-down sensors 1341-1344 are configured to sense the moving speed of the respective transfer carriage 1310, 1320 as the respective transfer carriage 1310 or 1320 moves from one operating position to another operating position in the switcher 1300 and provide or generate associated output signals or data for the controller. If the moving speed exceeds a pre-determined threshold, the controller is configured to control the drive or motor to appropriately reduce the speed to a safe speed or range of speeds.

Figure 13B:
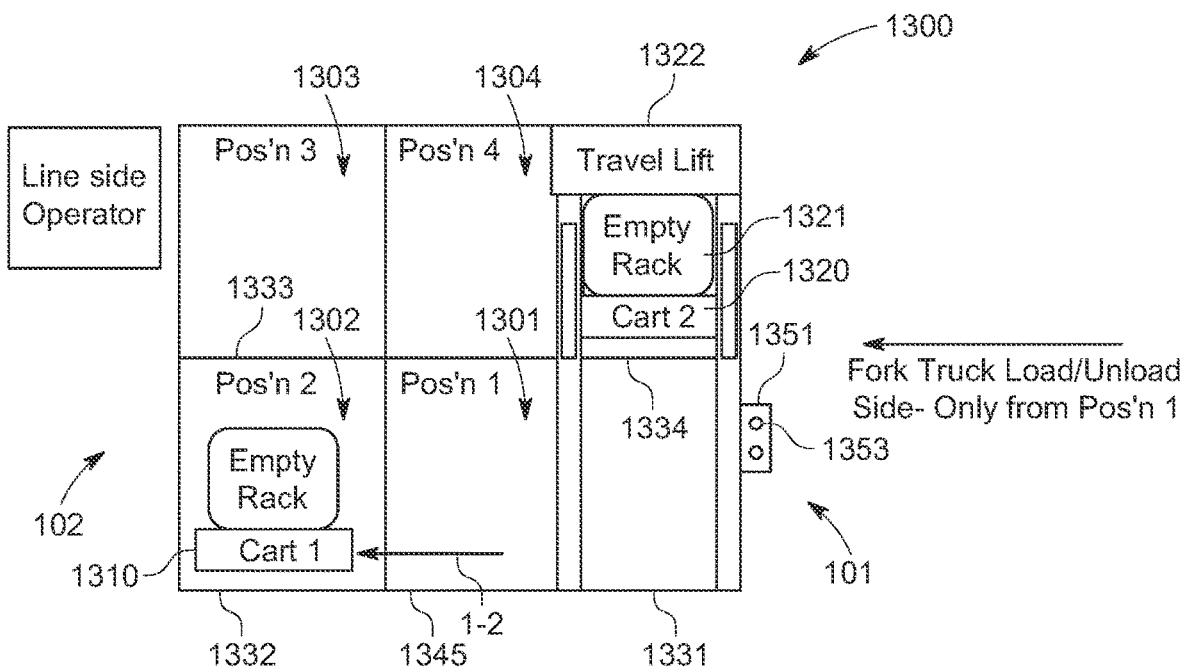
FIG. 13B shows the exemplary sequence of operations for the rack loading and switcher system with the first rack moved to "Position 2"

As shown in FIG. 13B, the first transfer carriage 1310 and the loaded bin or rack 1312 are moved by the motor or drive mechanism from "Position-1" 1301 to "Position-2" 1302 at the operator or line side 102 of the switcher system 1300, as further indicated by arrow 1-2. According to an exemplary implementation, the switcher system 1300 comprises a loading side control panel 1351 configured with a "Reset Load Light Curtain" button 1353, which is pressed by the fork-lift operator to initiate movement of the transfer carriage 1310 by the drive mechanism. The Position-2 detect or proximity sensor (an electronic sensor or a relay logic sensor or output device) 1332 detects when the transfer carriage 1310 and the full rack 1312 are properly positioned, and disable the line side safety or light curtain 1306 to allow the operator, e.g. assembly line worker, to access, e.g. pick parts off, the rack or bin 1312 on the transfer carriage 1310. The switcher 1300 may include a slow-down sensor 1345 (an electronic sensor device or a relay logic device) which is configured to monitor the moving speed of the transfer carriage 1310, 1320 between "Position-1" 1301 and "Position-2" 1302 as indicated by arrow 1-2, and reduce speed if a pre-determined threshold is exceeded, in a manner similar to that described above.

Figure 13C:
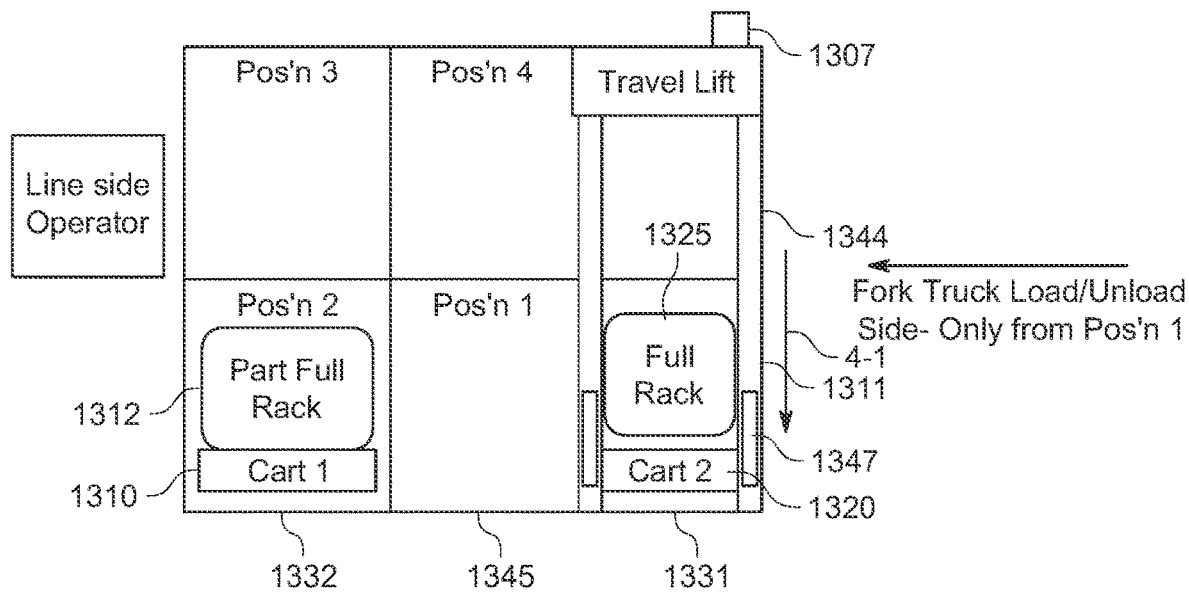
FIG. 13C shows the exemplary sequence of operations for the rack loading and switcher system with a loaded second rack moved or loaded into "Position 1"

Referring next to FIG. 13C, which shows the second transfer carriage 1320 lowered by the travel lift 1322 from "Position-4" 1304 to "Position-1" 1301 as indicated by arrow 4-1 for loading with a full or loaded rack or bin, indicated by reference 1325. The safety beacon 1307 is illuminated under the control of the controller 160 to indicated the "Clear to Enter" condition or state for the forklift truck/driver. The forklift driver loads the second full rack or bin 1325 on the second transfer carriage 1320 as shown. The switcher system 1300 may include additional loading or proximity sensor(s) to generate an output, e.g. signal, for the controller 160 indicating that the rack or bin 1325 (and bin 1312) is properly loaded or positioned on the second transfer carriage 1320 (or the first transfer carriage 1310). In the response, the controller 160 activates the safety beacon 1307 to indicate the "Rack Loaded Correctly" state for the forklift driver or other operator. The movement and position of the second transfer carriage 1320 is monitored by the sensors 1341 and 1344.

Figure 13D:
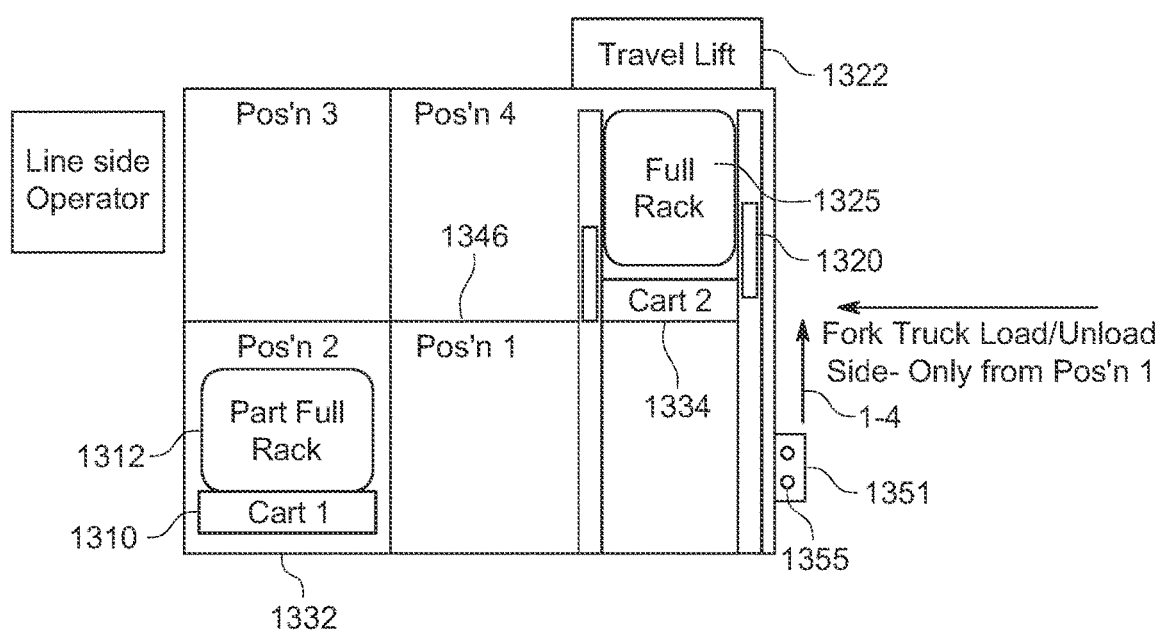
FIG. 13D shows the exemplary sequence of operations for the rack loading and switcher system with the loaded second rack moved to "Position 2"

Reference is next made to FIG. 13D, which shows the switcher system 1300 moving the second transfer carriage 1320 with the full or loaded bin 1325 after being loaded from "Position-1" 1301 to "Position-4" 1304. With the safety beacon 1307 showing the "Rack Loaded Correctly" state (FIG. 13C), the forklift driver or another operator presses "Reset Load Light Curtain" 1355 on the loading side control panel 1351, and the controller operates or actuates the travel lift mechanism 1322 to move the second transfer carriage 1320 with the loaded bin 1325 to "Position-4" 1304 as indicated by arrow 1-4 in FIG. 13D.

Figure 13E:
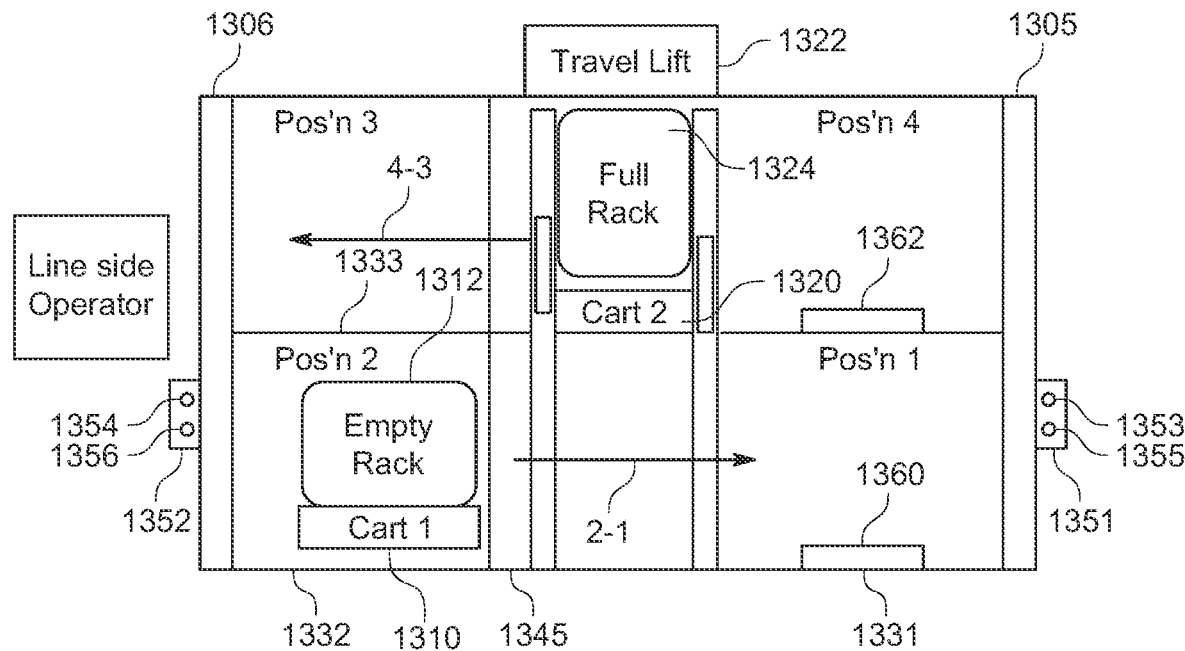
FIG. 13E shows the exemplary sequence of operations for the rack loading and switcher system with the empty first rack being moved back to "Position 1" and the loaded second rack being moved to a "Position 3" in the switcher system.
Figure 13F:
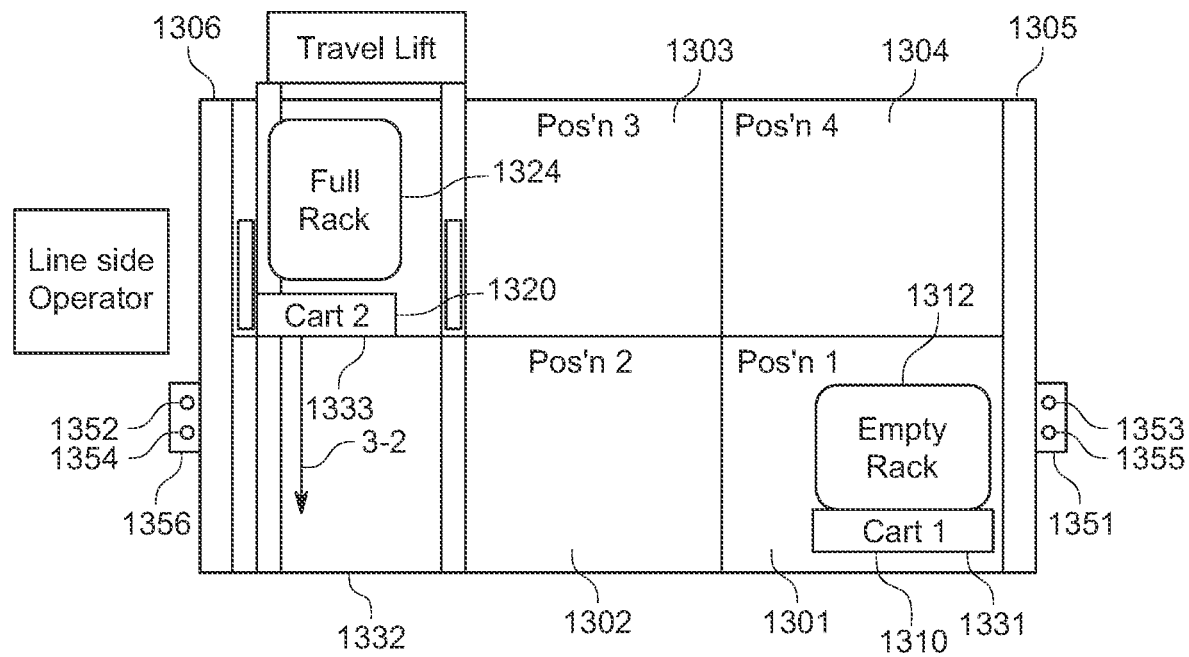
FIG. 13F shows the exemplary sequence of operations for the rack loading and switcher system with the empty first rack moved back to "Position 1" and the loaded second rack being moved from Position 3 to Position 2.

Reference is next made to FIG. 13E, which depict the sequential movement, or substantially simultaneous movement, of the first transfer carriage 1310 from "Position-2" 1302 back to "Position-1" 1301 and the second transfer carriage 1320 from "Position-4" 1304 to "Position-3" 1303, and then from "Position-3" 1303 to "Position-2" 1302 as depicted in FIG. 13F. As shown, the switcher system 1300 is configured with a first or lower drive mechanism unit indicated generally by reference 1360 and a second or upper drive mechanism or unit indicated generally by reference 1362. The lower drive unit 1360 is configured to move the first transfer carriage 1310 back and forth between "Position-1" 1301 and "Position-2" 1302 as indicated by arrows 1-2, 2-1. Similarly, the upper drive unit 1362 is configured to move the second transfer carriage 1320 and the travel lift mechanism 1322 back and forth between "Position-3" 1303 and "Position-4" 1304 as indicated by arrows 3-4, 4-3. The drive units 1360, 1362 may be implemented in known manner, for instance, utilizing a hydraulic mechanism or actuator, or a belt drive and motor unit, or a motor and worm-gear drive unit.

Referring still to FIG. 13E, the lineside operator clears the Lineside Operator Light Curtain 1306 and then presses an "Operator Light Curtain Tripped" button 1354 on the lineside operator panel 1352 and then a "Cycle Start Button" 1356 on the lineside operator panel 1352. In response to signal(s) or data inputs from the lineside operator panel 1352, the controller 160 is configured to control the lower drive unit 1360 to move the first transfer carriage 1310 with an empty rack or bin indicated by reference 1312 from "Position-2" 1302 back to "Position-1" 1301 as indicated by arrow 2-1, i.e. a reverse direction. Similarly, the controller 160 is configured to control the upper drive unit 1362 to move the second transfer carriage 1320 with a full rack or bin indicated by reference 1324 from "Position-4" 1304 to "Position-3" 1303 as indicated by arrow 4-3, i.e. a forward direction. The controller 160 can be configured to move the first transfer carriage 1310 and the second transfer carriage 1320 substantially simultaneously, or in the alternative, sequentially. As further shown in FIG. 13F, once the controller 160 detects that the second transfer carriage 1320 is properly located or situated in "Position-3" 1303, i.e. via an output signal or data from the Position-3 location sensor 1333 (and the first transfer carriage 1310 has been moved from Position-2 1302, i.e. via an appropriate output signal from the location sensor 1332), the controller 160 actuates the transfer lift mechanism 1322 to lower the second transfer carriage 1320 with the full rack or bin 1324 from "Position-3" 1303 to "Position-2" 1302 as indicated by arrow 3-2 in FIG. 13F. On the Load/Unload side 101, the first transfer carriage 1310 with the empty bin or rack 1312 is in position for unloading, and the controller 160 activates the safety beacon 1307 to indicate the "Clear to Enter" state for example by illuminating a green light. The forklift driver or operator is free to remove the empty rack 1312 from the first transfer carriage 1310.

Figure 13G:
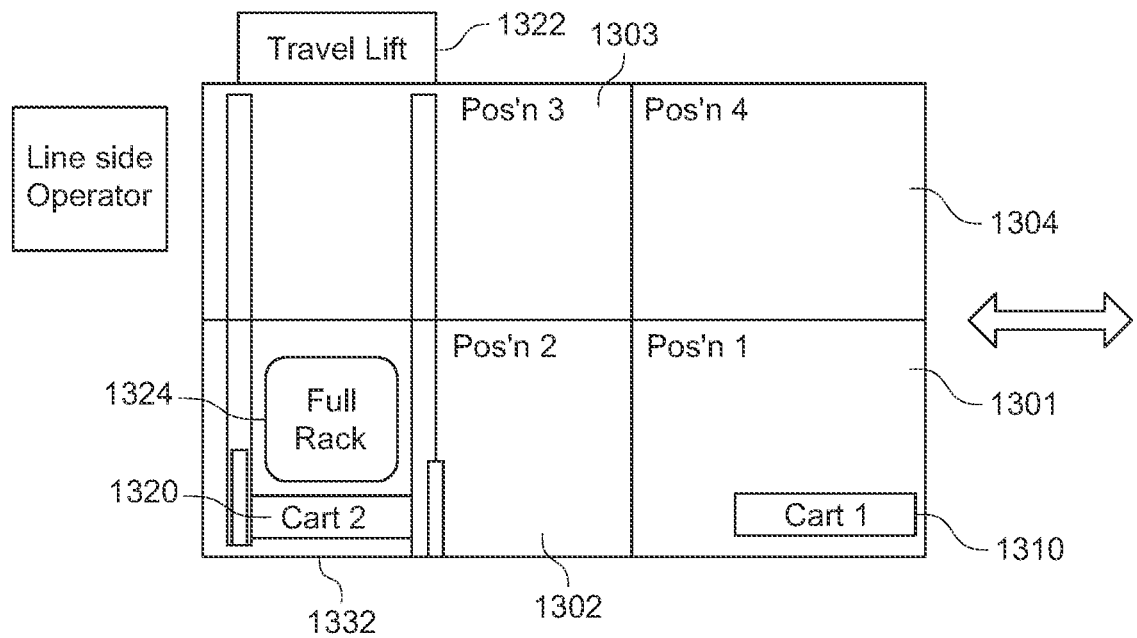
FIG. 13G shows the exemplary sequence of operations for the rack loading and switcher system with the empty first rack removed or unloaded from "Position 1" and the loaded second rack moved to Position 2 and ready for unloading or access at the line side operator.
Figure 13H:
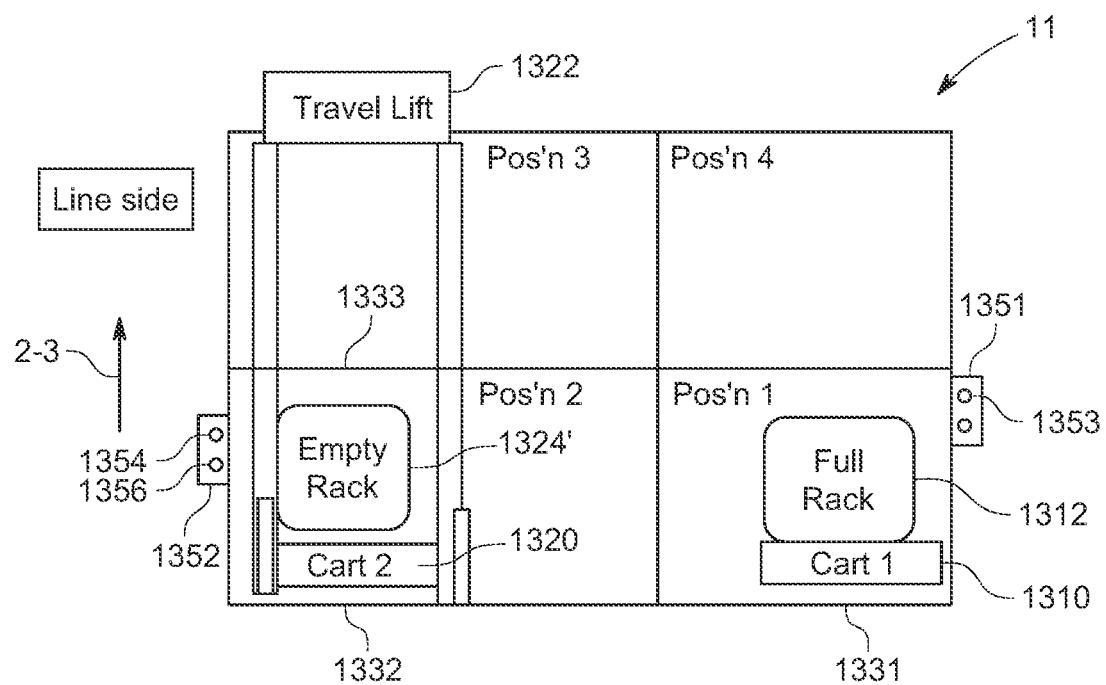
FIG. 13H shows the exemplary sequence of operations for the rack loading and switcher system with the empty second rack being moved back to "Position 3" and the loaded second rack being moved from Position 1 to Position 2.
Figure 13I:
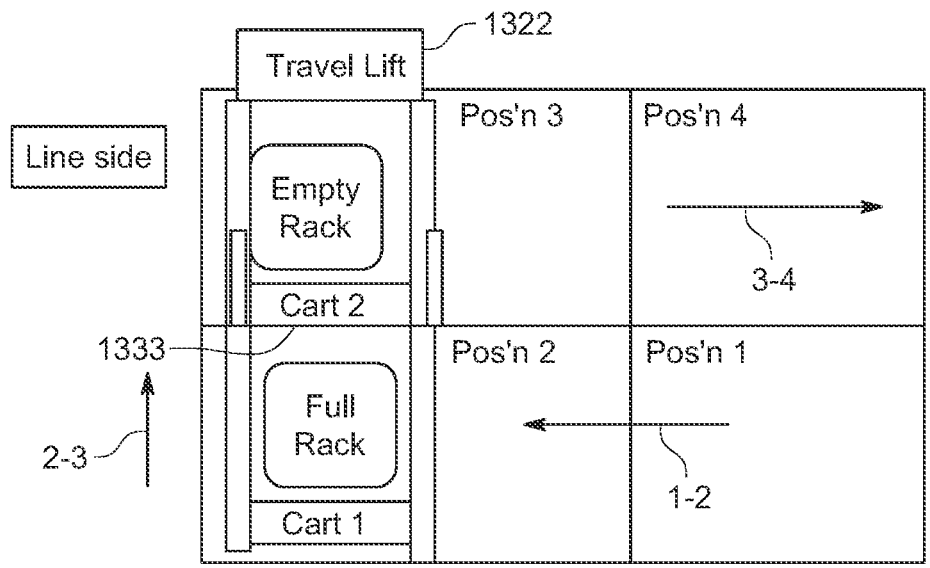
FIG. 13I shows the exemplary sequence of operations for the rack loading and switcher system with the empty rack raised and moved to "Position-3" and the second full rack moved from Position-1 to Position-2 and located underneath the empty rack in Position-3.
Figure 13J:
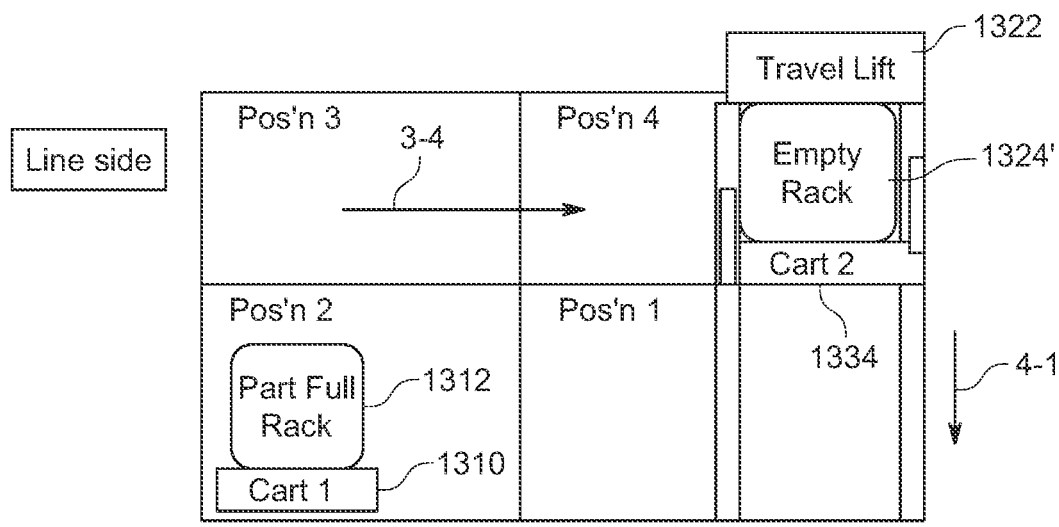
FIG. 13J shows the exemplary sequence of operations for the rack loading and switcher system with the empty second rack being moved back, i.e. lowered, to "Position 1" from "Position 4" and the loaded first rack moved from Position 2 and ready for unloading or access at the line side operator.

Reference is next made to FIG. 13G. With the second transfer carriage 1320 and new full rack or bin 1324 located at "Position-2" 1302, the lineside operator is free to pick or pull the full rack 1324 on the transfer carriage 1320. As shown in FIG. 13H, a new full rack or bin 1312 is loaded onto the first transfer carriage 1310 in "Position-1" 1301 by the forklift driver or operator, and the driver or an operator presses the "Reset Load Light Curtain" button 1353 on the panel 1351 at the "load side" 101.

Referring still to FIG. 13H, the lineside operator initiates a new cycle, e.g. calling for a new rack or bin, by pressing the "Reset Load Light Curtain" button 1354 and then the "Operator Cycle Start" button 1356 on the lineside operator panel 1352. In response to the output signal(s) from operator panel 1352, the controller 160 actuates the travel lift mechanism 1322 to raise the second transfer carriage 1320 and the empty rack indicated by reference 1324' from "Position-2" 1302 to "Position-3" 1303 as shown in FIG. 13H and indicated by arrow 2-3. Once the second transfer carriage 1320 and the empty rack 1324' are moved to "Position-3" 1303 as determined or verified by an output signal from the position location sensor 1333, the controller 160 actuates the upper drive unit 1362 to move (i.e. in reverse) the second transfer carriage 1320 with the empty rack 1324' (and the travel lift mechanism 1322) from "Position-3" 1303 to "Position-4" 1304 as indicated by arrow 3-4 in FIG. 13I. Simultaneously, or sequentially (as described above), the controller 160 actuates the first drive mechanism or lower drive unit 1360 to move the first transfer carriage 1310 with the new loaded rack 1312 from "Position-1" 1301 to "Position-2" 1301 as indicated by arrow 1-2 in FIG. 13I. As further shown in FIG. 13J, once the second transfer carriage 1320 with the empty rack 1324' is positioned or located in "Position-4", for instance as verified by the position location sensor 1334, the controller 160 actuates the travel lift mechanism 1322 to lower the second transfer carriage 1320 and the empty rack 1324' from "Position-4" 1304 to "Position-1" 1301 as indicated by arrow 4-1 in FIG. 13J, for subsequent unloading and then reloading a new rack as described above.

According to another aspect and embodiment, the cart loader/unloader and switcher system 1300 may be configured to operate in a bypass lift mode, for example, implemented in a control module or logic circuit in the controller 160, e.g. a microcontroller or processor, operating under stored program control, or a logic circuit, or other type of programmable control device or circuit, or a relay logic controller or system. According to an exemplary implementation, the bypass lift mode is triggered if the operator side safety sensor 1306, i.e. light curtain, is breached. In bypass lift mode, the switcher system 1300 is configured to allow the transfer lift mechanism 1322 to move between "Position 1" 1301 and "Position 4" 1304 if the first transfer carriage 1310 is located at the operator side 102 and the lift mechanism 1322 is located or positioned at the forklift loading/unloading side 101.

Reference is next made to FIG. 14, which shows an exemplary implementation for the controller 160 and indicated generally by reference 1400. The controller 1400 is implemented and configured to execute and/or control the functionality and features of the embodiments of the switcher system 100, 1300 as described herein. The controller 1400 is implemented in a hardware-based configuration and comprises a processor 1401, a main memory 1402, a read only memory or ROM 1404, a storage device 1406, an input device interface 1420, and an output device interface 1430. According to an exemplary implementation as described above, the controller 1400 also includes a device interface 1440 for the safety light or bean 1307 (FIG. 13A). The controller 1400 may also include a communication interface for interfacing to a central plant computer or control system. The hardware components may be coupled utilizing a bus and/or an input/output port configuration.

According to the embodiments of the switcher system 100, 1300 as described above, the input device interface 1420 comprises an interface configured to couple to the proximity or location sensors (e.g. electronic sensors and/or relay logic devices), i.e. "Position-1" detect sensor 1331 (FIG. 13A), "Position-2" detect sensor 1332 (FIG. 13A), "Position-3" detect sensor 1333 (FIG. 13A), and "Position-4" detect sensor 1334 (FIG. 13A), and the slow-down sensors, comprising the "Position-1" slow-down sensor 1341 (FIG. 13A), "Position-2" slow-down sensor 1342 (FIG. 13A), "Position-3" slow-down sensor 1343 (FIG. 13A), "Position-4" slow-down sensor 1344 (FIG. 13A), and the horizontal slow-down sensors comprising the "Position-1" slow-down sensor 1345 (FIG. 13A) and "Position-4" slow-down sensor 1346 (FIG. 13A). The input device interface 1420 also includes an interface configured to couple to the load side 1305 and the operator side 1306 safety or light curtains (FIG. 13A) and the loading side control panel 1351 (FIG. 13A) and the lineside operator control panel 1352 (FIG. 13A). The controller 1400 is configured to receive and process output signals from these sensors and control the speed and/or positional movement of the first transfer carriage 1310, and/or the second transfer carriage 1320 and the travel lift mechanism 1322.

According to the embodiments of the switcher system 100, 1300 as described above, the output device interface 1430 comprises an interface configured to couple and control the drive mechanism for the first transfer carriage 150 (FIG. 1), the drive mechanism for the travel lift mechanism 152 (FIG. 1), and the lift drive mechanism(s) for the scissor lift mechanisms 170, 172 (FIG. 5).

According to the embodiment of the switch system 1300, the output device interface 1430 couples the controller 1400 to the safety light or beacon 1307 (FIG. 13A). The controller 1400 is configured to control the illumination states of the safety light 1307.

As will readily understood by those skilled in the art, the processor 1401 may comprise a computer, a microprocessor, a microcontroller or other type of hardware-based processing device or logic board or circuit board or programmable logic array that is configured to interpret inputs and data and/or execute instructions to perform the functional operations, the control functions, the monitoring operations and other functions associated with the operation of the switcher system as described herein. The main memory 1402 may comprise a random access memory (RAM) or other types of dynamic storage device that is configured to store information and/or instructions for execution by the processor 1401. The ROM 1404 may comprise a conventional ROM device or another type of static or non-volatile storage device configured to store static information and/or instructions for use by the processor 1401. The storage device 1406 may comprise a mass storage device for storing or archiving operational data and other information.

The particular implementation details associated with the hardware and/or software components comprising the controller 1400 will readily be within the understanding of those skilled in the art of digital and/or analog hardware design, logic and logic relay design, and computer programming in high level programming languages and/or firmware design.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. An industrial materials handling and delivery system, said system comprising:
   a base member having a loading end and an operator end;
   said loading end being configured with a loading side sensor, and said operator end being configured with an operator side sensor;
   a controller, said controller having an input/output module, said input/output module being operatively coupled to said loading side sensor and to said operator side sensor;
   a first carriage for carrying a first bin, said first carriage being operatively coupled to said base member and operatively coupled to a first drive mechanism configured to move said first carriage between said loading end and said operator end under the control of said controller;
   a second carriage for carrying a second bin, said second carriage being operatively coupled to said base member and operatively coupled to a second drive mechanism configured to move said second carriage between said loading end and said operator end under the control of said controller;
   said base member including a loading side position sensor and an operator side position sensor operatively coupled to said controller, said loading side position sensor being configured to detect when said first carriage or said second carriage is positioned in a loading/unloading position at the loading end, and said operator side position sensor being configured to detect when said first carriage or said second carriage is positioned in a loading/unloading position at the operator end;
   a bypass mechanism configured to support said second carriage and said second bin, said bypass mechanism being operatively coupled to the input/output module of said controller and responsive to control by said controller;
   said bypass mechanism being operatively coupled to said base member and configured to move said second carriage between said loading end and said operator end under the control of said controller;
   said bypass mechanism being further configured to operate in a bypass mode under the control of said controller, and in said bypass mode said bypass mechanism being operable to permit movement of said first carriage and said first bin between said loading end and said operator end independently of said second carriage and said second bin.

2. The industrial materials handling and delivery system as claimed in claim 1, wherein said bypass mechanism comprises a lift mechanism having a lower section operatively coupled to said base member and an upper section configured to support said second carriage, and said bypass mode comprising a raised position above said base member, and in said raised position said lift mechanism allowing for movement of said first carriage between said loading end and said operator end along said base member.

3. The industrial materials handling and delivery system as claimed in claim 2, wherein said controller is configured to generate an alarm and a cycle-stop condition if said loading side sensor is activated through a breach during any movement of the first carriage, any movement of the second carriage or any movement of said lift mechanism.

4. The industrial materials handling and delivery system as claimed in claim 3, further including a safety indicator, said safety indicator being operatively coupled to the input/output module of said controller, and said controller being configured to operate said safety indicator in two modes comprising a clear to enter state for loading/unloading at said loading end, and a not clear to enter state at said loading end, and in said not clear to enter state said controller being configured to be responsive to any actuation of said loading side sensor.

5. The industrial materials handling and delivery system as claimed in claim 2, wherein said operator end includes an operator panel being operatively coupled to the input/output module of said controller, and said operator panel comprising an operator cycle start actuator, wherein in response to actuation of said operator cycle start actuator, said controller being configured to actuate said lift mechanism to raise said second carriage and said second bin from a first lower position at said operator end to a first upper position above said base member, said controller being configured to activate a lower drive mechanism to move said first carriage with a loaded first bin from said loading end to said first lower position at said operator side, and said controller being configured to activate an upper drive mechanism to move said second carriage and said second bin from said first upper position to a second upper position above said base member, and said controller being configured to actuate said lift mechanism to lower said second carriage and said second bin to a second lower position at said loading end, so that said second bin can be replaced with another bin loaded with industrial materials.

6. The industrial materials handling and delivery system as claimed in claim 5, wherein said operator panel includes a reset state actuator for said loading side sensor, wherein in response to actuation of said reset state actuator, said controller being configured to disable said loading side sensor so that said second bin can be replaced with another bin loaded with materials at said loading end.

7. The industrial materials handling and delivery system as claimed in claim 5, further including a first speed sensor operatively coupled to the input/output module of said controller and configured to sense the moving speed of said first carriage between said loading end and said operating end, a second speed sensor operatively coupled to the input/output module of said controller and configured to sense the moving speed of said second carriage between said first lower position and said first upper position at said operating end, a third speed sensor operatively coupled to the input/output module of said controller and configured to sense the moving speed of said second carriage between said first upper position at said operating end and said second upper position at said loading end, and a fourth speed sensor operatively coupled to the input/output module of said controller and configured to sense the moving speed of said second carriage between said second upper position and said second lower position at said loading end, and said controller being configured to control said lower drive mechanism, said upper drive mechanism, and said lift mechanism, to reduce the moving speed of said first carriage, said second carriage and/or said lift mechanism if said moving speed exceeds a pre-determined threshold.

8. The industrial materials handling and delivery system as claimed in claim 2, wherein said loading end includes a loading side control panel being operatively coupled to the input/output module of said controller, and said loading side control panel comprising a reset loading side sensor actuator, wherein in response to actuation of said reset loading side sensor actuator, said controller being configured to actuate said first drive mechanism to move said first carriage and said first bin from said loading end to said operator end, and said controller being configured to disable said operator side sensor so that an operator can access said first bin loaded with industrial materials on said first carriage.

* * * * *